United States Patent
Kang et al.

(10) Patent No.: US 9,889,414 B2
(45) Date of Patent: Feb. 13, 2018

(54) CARBONATED WATER PRODUCTION UNIT, REFRIGERATOR HAVING THE SAME AND METHOD OF CONTROLLING THE SAME

(71) Applicant: SAMSUNG ELECTRONICS CO., LTD., Suwon-si, Gyeonggi-do (KR)

(72) Inventors: Seung Wan Kang, Yongin-si (KR); Jung Won Park, Suwon-si (KR); Sung Ho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 15/045,844

(22) Filed: Feb. 17, 2016

(65) Prior Publication Data

US 2016/0243509 A1 Aug. 25, 2016

(30) Foreign Application Priority Data

Feb. 24, 2015 (KR) ........................ 10-2015-0025914

(51) Int. Cl.
  *B01F 3/04* (2006.01)
  *F25D 31/00* (2006.01)
  *A23L 2/54* (2006.01)
  *F25D 23/12* (2006.01)
  (Continued)

(52) U.S. Cl.
  CPC ............ *B01F 3/04808* (2013.01); *A23L 2/54* (2013.01); *B01F 3/04787* (2013.01);
  (Continued)

(58) Field of Classification Search
  CPC .............. B01F 3/04099; B01F 3/04106; B01F 3/04787; B01F 3/04808; B01F 3/04815
  (Continued)

(56) References Cited

U.S. PATENT DOCUMENTS 2,647,734 A * 8/1953 Nicholas ............. B01F 3/04808
137/100
4,323,090 A 4/1982 Magi
(Continued)

FOREIGN PATENT DOCUMENTS

CN 103876625 6/2014
CN 104019596 9/2014
(Continued)

OTHER PUBLICATIONS

Extended European Search Report dated Jul. 8, 2016 from European Patent Application No. 16156771.4, 8 pages.
(Continued)

*Primary Examiner* — Robert A Hopkins
(74) *Attorney, Agent, or Firm* — Staas & Halsey LLP

(57) ABSTRACT

A carbonated water production unit for a refrigerator includes a coupler to which a container is coupled to be detachable, a cylinder configured to store carbon dioxide, a nozzle module configured to inject carbon dioxide into the container, a regulation member, a first valve, a second valve, a user interface which receives a command for production of carbonated water and an input of concentration of the carbonated water, and a controller which controls the first valve to supply water when the command for the production of carbonated water is input, determines information on injection of the carbon dioxide corresponding to the concentration of the carbonated water when the supply of water is completed, controls the regulation member to inject the carbon dioxide based on the determined information on the injection, and controls the second valve to regulate the pressure of the container when injection of the carbon dioxide is completed.

22 Claims, 24 Drawing Sheets

(51) Int. Cl.
 *B01F 15/02* (2006.01)
 *B01F 15/00* (2006.01)
(52) U.S. Cl.
 CPC .... *B01F 3/04815* (2013.01); *B01F 15/00155* (2013.01); *B01F 15/026* (2013.01); *F25D 23/12* (2013.01); *F25D 23/126* (2013.01); *F25D 31/002* (2013.01); *A23V 2002/00* (2013.01)
(58) Field of Classification Search
 USPC .................................................. 261/121.1
 See application file for complete search history.

(56) References Cited

U.S. PATENT DOCUMENTS

| | | | |
|---|---|---|---|
| 2010/0066226 A1 | 3/2010 | Luisi et al. | |
| 2010/0251901 A1 | 10/2010 | Santoiemmo | |
| 2014/0242219 A1* | 8/2014 | Cho | F25D 23/126 426/67 |

FOREIGN PATENT DOCUMENTS

| | | |
|---|---|---|
| CN | 105371581 | 3/2016 |
| EP | 1 503 952 | 2/2005 |
| EP | 1580502 | 9/2005 |
| EP | 2 238 078 | 10/2010 |
| EP | 2664880 | 11/2013 |
| EP | 2772713 A2 | 9/2014 |
| EP | 2772713 A3 | 4/2015 |
| KR | 10-2005-0087525 | 8/2005 |
| KR | 10-2008-0016770 | 2/2008 |
| KR | 10-2010-0011767 | 2/2010 |
| KR | 10-2010-0035280 | 4/2010 |
| KR | 10-2010-0052791 | 5/2010 |
| KR | 10-2011-0003952 | 1/2011 |
| KR | 10-2011-0098419 | 9/2011 |
| KR | 10-1245635 | 3/2013 |
| KR | 10-2013-0044988 | 5/2013 |
| KR | 10-2014-0108057 | 9/2014 |
| WO | WO 2016/024730 | 2/2016 |

OTHER PUBLICATIONS

European Office Action dated Jun. 29, 2017 from European Patent Application No. 16156771.4, 6 pages.
Chinese Office Action dated Nov. 27, 2017 in Chinese Patent Application No. 201610101447.7.

* cited by examiner

CARBONATED WATER PRODUCTION UNIT, REFRIGERATOR HAVING THE SAME AND METHOD OF CONTROLLING THE SAME

CROSS-REFERENCE TO RELATED APPLICATIONS

This application claims the priority benefit of Korean Patent Application No. 10-2015-0025914, filed on Feb. 24, 2015 in the Korean Intellectual Property Office, the disclosure of which is incorporated herein by reference in its entirety.

BACKGROUND

1. Field

Embodiments of the disclosure relate to a carbonated water production unit for producing and supplying carbonated water, a refrigerator provided with the carbonated water production unit, and a method of controlling the carbonated water production unit.

2. Description of the Related Art

As a refrigerator is an apparatus for maintaining the freshness of stored groceries, such as food, drinks, etc., and storing the stored groceries for a long time, the refrigerator may include a storage room which may freeze or refrigerate and store the groceries, and a compressor, a condenser, an expansion valve, an evaporator which are provided in a mechanical compartment and perform a freezing cycle having compression, condensation, expansion, and evaporation processes, etc.

Such a refrigerator maintains a temperature of the inside of the storage room at a freezing or refrigerating temperature using a heat exchanged cold air during the evaporation process of the freezing cycle.

Recently, as the standard of living is improved, the capacity of a refrigerator has been increased to store various kinds of and more numerous groceries, and functions thereof have also been diversified to improve the convenience of users.

Further, the refrigerator may also include an ice making unit which makes ice and a dispenser from which users may get water or the ice outside without opening doors according to the requirements of the users.

SUMMARY

Therefore, it is an aspect of the disclosure to provide a carbonated water production unit which controls an injection of carbon dioxide based on the concentration of carbonated water selected when a user selects the concentration of the carbonated water while a container is coupled thereto, a refrigerator having the same, and a method of controlling the same.

It is an aspect of the disclosure to provide a carbonated water production unit which increase the concentration of carbonated water by additionally injecting carbon dioxide when a user selects additional carbonic acid when the production of the carbonated water is completed, a refrigerator having the same, and a method of controlling the same Additional aspects of the disclosure will be set forth in part in the description which follows and, in part, will be apparent from the description or may be learned by practice of the disclosure.

In accordance with an aspect of the disclosure, a carbonated water production unit may include: a coupler to which a container is coupled to be detachable, a cylinder configured to store carbon dioxide, a nozzle module configured to inject carbon dioxide into the container, a regulation member which is disposed at a channel between the cylinder and the nozzle module and regulates a supply of the carbon dioxide, a first valve which is disposed at a water supply pipe configured to supply water into the container and regulates the supply of water, a second valve which is disposed at a pressure regulation pipe through which air in the container flows and regulates a pressure of the container, a user interface which receives a command for production of carbonated water and an input of concentration of the carbonated water and outputs information on the production of the carbonated water, and a controller to which the container is coupled. The controller controls the first valve to supply water when the command for the production of carbonated water is input, determines information on injection of the carbon dioxide corresponding to the concentration of the carbonated water when the supply of water is completed, controls the regulation member to inject the carbon dioxide based on the determined information on the injection, and controls the second valve to regulate the pressure of the container when injection of the carbon dioxide is completed.

The user interface may further receive an input of a command for adding carbonic acid, and the controller may control the regulation member to additionally inject carbon dioxide when the production of the carbonated water is completed and the command for adding carbonic acid is input, and may control the second valve to regulate the pressure of the container when the additional injection of the carbon dioxide is completed.

The carbonated water production unit may further include a water level detector configured to detect a water level of the container, wherein the controller may control the production of the carbonated water to be stopped when the detected water level is a predetermined water level or more, and may control information on the stopped carbonated water production to be displayed on the user interface.

The controller may control the regulation member to deactivate an operation of the water level detector during the injection of carbon dioxide.

The controller may determine the number of injections of the carbon dioxide corresponding to the concentration of the carbonated water, and may sequentially and repeatedly control the control of the regulation member and a control of opening of the second valve according to the determined the number of injections.

The carbonated water production unit may further include a coupling detector provided at the coupler and configured to detect coupling of the container, wherein the controller may control the user interface to be activated when it is determined that the container is coupled thereto based on a signal detected from the coupling detector.

The controller may control opening of the second valve before supplying water and may control closing of the second valve when the supply of water is completed.

The user interface may further receive an input of a command for stopping carbonic acid production, and the controller may control the production of the carbonated water to be stopped when a stop command for the production of the carbonated water is input while producing the carbonated water.

The carbonated water production unit may further include a third valve configured to discharge at least one of water and carbon dioxide inside the container to the outside of the container when the water in the container is a predetermined water level or more.

In accordance with an aspect of the disclosure, a refrigerator comprising a dispenser provided at a door, wherein the dispenser may include: a first outlet configured to discharge water and carbon dioxide for production of carbonated water, a second outlet configured to discharge water stored in a tank of a refrigerator compartment and ice in a icehouse, a user interface which receives a selection of any one object among carbonated water, purified water, and ice, receives an input of a command for production of carbonated water and concentration of the carbonated water, and outputs information on the production of the carbonated water, a coupler provided at the first outlet, wherein a container is coupled to the coupler to be detachable, a cylinder configured to store carbon dioxide, and a controller which controls water in the tank to be supplied into the container when a command for the production of the carbonated water is input, controls carbon dioxide of the cylinder to be supplied into the container based on information on injection of carbon dioxide corresponding to the concentration of the carbonated water when the supply of water is completed, and controls a pressure of the container to be regulated when the injection of carbon dioxide is completed.

The refrigerator may further include: a first valve which is disposed between the tank and a water supply pipe and regulate a supply of water, a regulation member which is disposed between the cylinder and a nozzle module configured to inject carbon dioxide and regulates a supply of the carbon dioxide, and a second valve which is disposed at a pressure regulation pipe through which air of the container flows and regulates the pressure of the container, wherein the controller controls opening of the second valve and the first valve when a command for production of the carbonated water is input, controls closing of the first valve and second valve when the supply of the water is completed, and controls the opening of the second valve when the injection of the carbon dioxide is completed.

The user interface may further receive an input of a command for adding carbonic acid, and the controller controls the regulation member for additional injection of carbon dioxide when the production of the carbonated water is completed and the command for adding carbonic acid is input.

The refrigerator may further include a flow rate detector configured to detect an amount of water which flows in the water supply pipe, wherein the controller controls the opening of the first valve based on the detected amount of the water.

The refrigerator may further include a water level detector configured to detect a water level of the container, wherein the controller controls the production of the carbonated water to be stopped when the detected water level is a predetermined water level or more, and controls information on the stopped carbonated water production to be displayed on the user interface.

The controller may determine the number of injections of carbon dioxide corresponding to the concentration of the carbonated water, and may sequentially and repeatedly control a control of a regulation member and a control of opening of a second valve according to the determined number of injections.

The dispenser may further include a third valve configured to discharge water and carbon dioxide inside the container to the outside of the container when the water in the container is a predetermined water level or more, and a discharge channel configured to guide the discharged water by opening the third valve to the outside.

In accordance with an aspect of the disclosure, a method of controlling a carbonated water production unit may include: determining whether a container is coupled to a coupler, controlling opening of a first valve disposed between a tank and a water supply pipe to supply water stored in the tank to the container when it is determined that the container is coupled thereto and a command for production of carbonated water is received, controlling a regulation member provided between a cylinder and a nozzle module to inject carbon dioxide into the container through the nozzle module when the supply of water is completed, controlling opening of a second valve provided at a pressure regulation pipe adjacent to the coupler to regulate a pressure of the inside of the container when the injection of carbon dioxide is completed, and outputting information on the completion of the production of the carbonated water. The controlling of the regulation member may include controlling the injection of carbon dioxide based on a concentration of carbonated water input through a user interface.

The method of controlling a carbonated water production unit may further include controlling the regulation member to additionally inject carbon dioxide when the production of the carbonated water is completed and a command for adding carbonic acid is input.

The controlling of the opening of the first valve may include determining an amount of water which flows in the water supply pipe, and determining a completion time of a supply of water based on the determined amount of water.

The method of controlling a carbonated water production unit may further include determining a water level of the container when the supply of water is completed and controlling the production of the carbonated water to be stopped when the determined water level is a predetermined water level or more, and controlling information on the stopped carbonated water production to be displayed on the user interface.

The method of controlling a carbonated water production unit may further include deactivating an operation of the water level detector while controlling the regulation member.

The controlling of the injection of carbon dioxide may include determining the number of injections of carbon dioxide corresponding to the concentration of the carbonated water, controlling the number of times the regulation member is controlled to inject carbon dioxide according to the determined number of injections, and opening the second valve whenever the injection of carbon dioxide is completed.

The method of controlling a carbonated water production unit may further include controlling the production of the carbonated water to be stopped when a stop command for the production of the carbonated water is input while producing the carbonated water.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
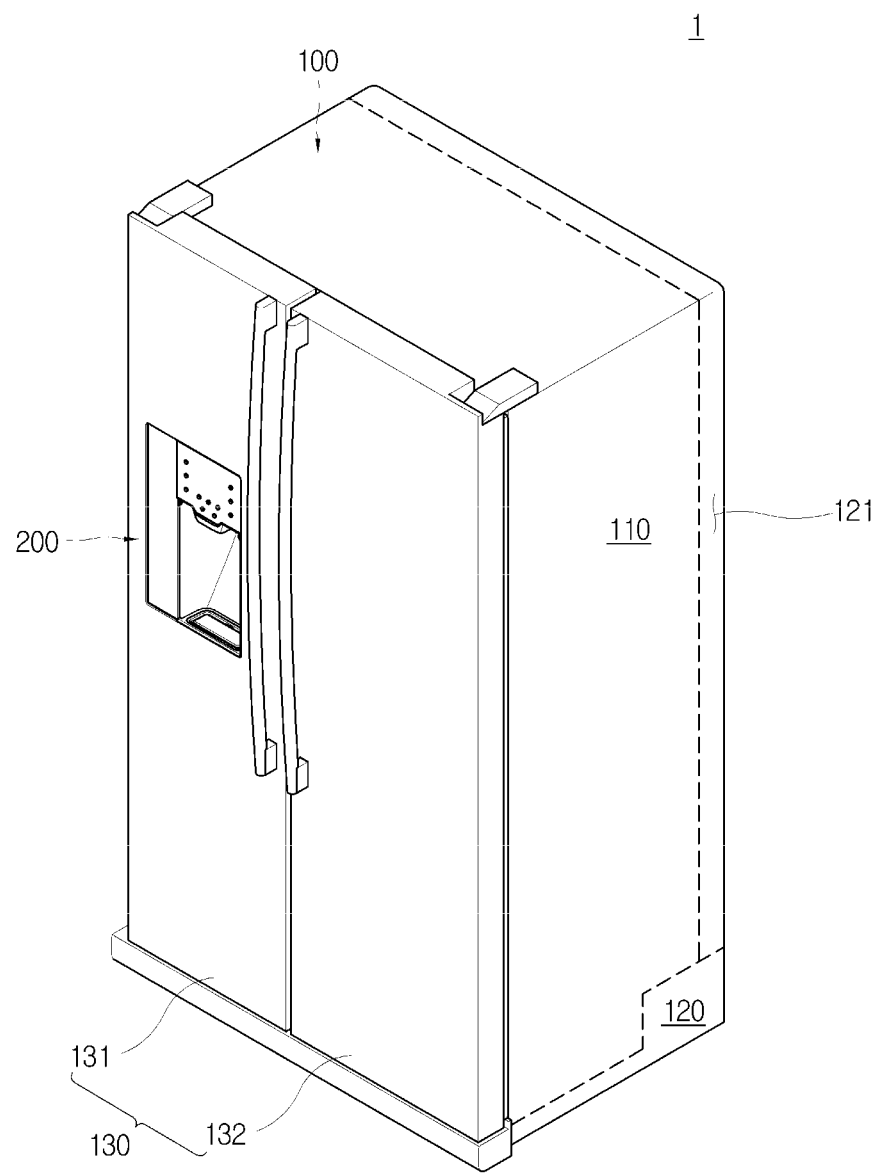
FIG. 1A is a perspective view of a refrigerator having a carbonated water production unit according to an embodiment.

Reference will now be made in detail to embodiments of the disclosure, examples of which are illustrated in the accompanying drawings, wherein like reference numerals refer to like elements throughout.

Hereinafter, the disclosure will be described in detail with reference to the accompanying drawings.

Figure 1B:
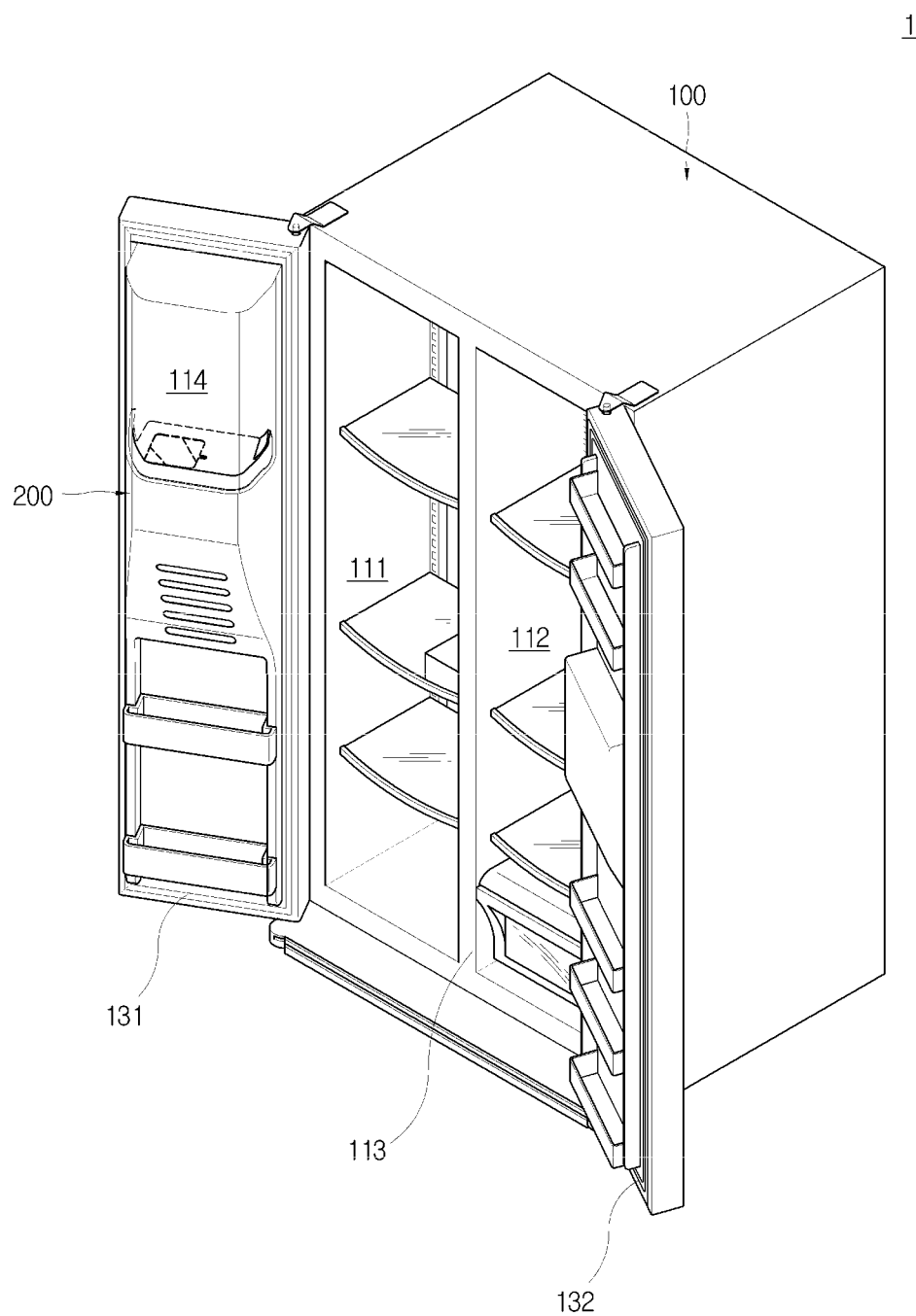
FIG. 1B is a view illustrating the inside of a refrigerator having the carbonated water production unit according to an embodiment.

FIG. 1A is a perspective view of a refrigerator having a carbonated water production unit according to an embodiment, and FIG. 1B is a view illustrating the inside of a refrigerator having the carbonated water production unit according to an embodiment.

As shown in FIG. 1A, a refrigerator 1 may include a main body 100 which forms an exterior thereof and has a storage room 110 and a machine room 120 and a dispenser 200 which supplies carbon dioxide and water for producing water (i.e., purified water), ice, and carbonated water.

As shown in FIG. 1B, as the storage room 110 of the refrigerator 1 is an accommodation space formed inside the main body 100, an intermediate partition 113 is provided in the accommodation space, and the accommodation space of the main body 100 is laterally partitioned by the intermediate partition 113.

That is, the storage room 110 may include a freezer compartment 111 and a refrigerator compartment 112 which are laterally partitioned by the intermediate partition 113.

Here, the freezer compartment 111 may be maintained at a temperature of about 18.5° C. below zero to freeze and store food, and the refrigerator compartment 112 may be maintained at a temperature of about 3° C. above zero to refrigerate and store food.

Shelves and storage boxes for storing food are mounted in the freezer compartment 111 and the refrigerator compartment 112.

The storage room 110 may further include an icehouse 114 for making ice, and the icehouse 114 may be provided inside the freezer compartment 111.

Furthermore, the icehouse 114 may be provided in the refrigerator compartment 112.

An ice making unit for producing and storing ice may be provided inside the icehouse 114 and may include an ice making tray which produces ice using purified water supplied from a tank, an ejector which ejects the ice produced in the ice making tray, a storage part which stores the ejected ice, etc.

A compressor (not shown) for compressing a refrigerant and discharging the refrigerant at high temperature and high pressure, a condenser (not shown) for condensing the refrigerant at high temperature and high pressure compressed in the compressor by radiating heat, and a fan for the condenser (not shown) for cooling the condenser are disposed in the mechanical compartment 120.

A duct 121 through which air flows is formed in an internal space of the main body 100, and an evaporator (not shown) which evaporates the refrigerant provided from the condenser and cools surrounding air using a cooling reaction by which surrounding latent heat is absorbed and a fan for the evaporator (not shown) which flows heat exchanged air from the evaporator are disposed in the duct 121.

That is, the evaporator performs a function of cooling the storage room 110 (111 and 112).

Such an evaporator may be positioned at each of a duct corresponding to the freezer compartment 111, a duct corresponding to the refrigerator compartment 112, and a duct corresponding to the icehouse 114.

Further, the evaporator may also be positioned at the duct corresponding to the freezer compartment only.

The main body 100 may include a plurality of holes provided in a surface of a wall of the storage room.

The plurality of holes are channels for flowing air in the duct 121 and the storage room 110 into other spaces. That is, air flows between the duct 121 and the storage room 110 via the plurality of holes.

The refrigerator 1 further may include doors 130 (131 and 132) which are provided at openings at front of the freezer compartment 111 and refrigerator compartment 112 to open or close the freezer compartment 111 and the refrigerator compartment 112, respectively.

The doors 130 (131 and 132) shield the freezer compartment 111 and the refrigerator compartment 112 from the outside.

A plurality of door shelves for storing food are mounted on an inner surface of each door 130 (131 and 132).

The refrigerator 1 further may include a dispenser 200 which supplies water or ice without a user opening the doors and also supplies water and carbon dioxide for producing carbonated water.

Such a dispenser 200 may be provided on the door 131 of the freezer compartment or may also be provided on the door 132 of the refrigerator compartment.

Figure 2:
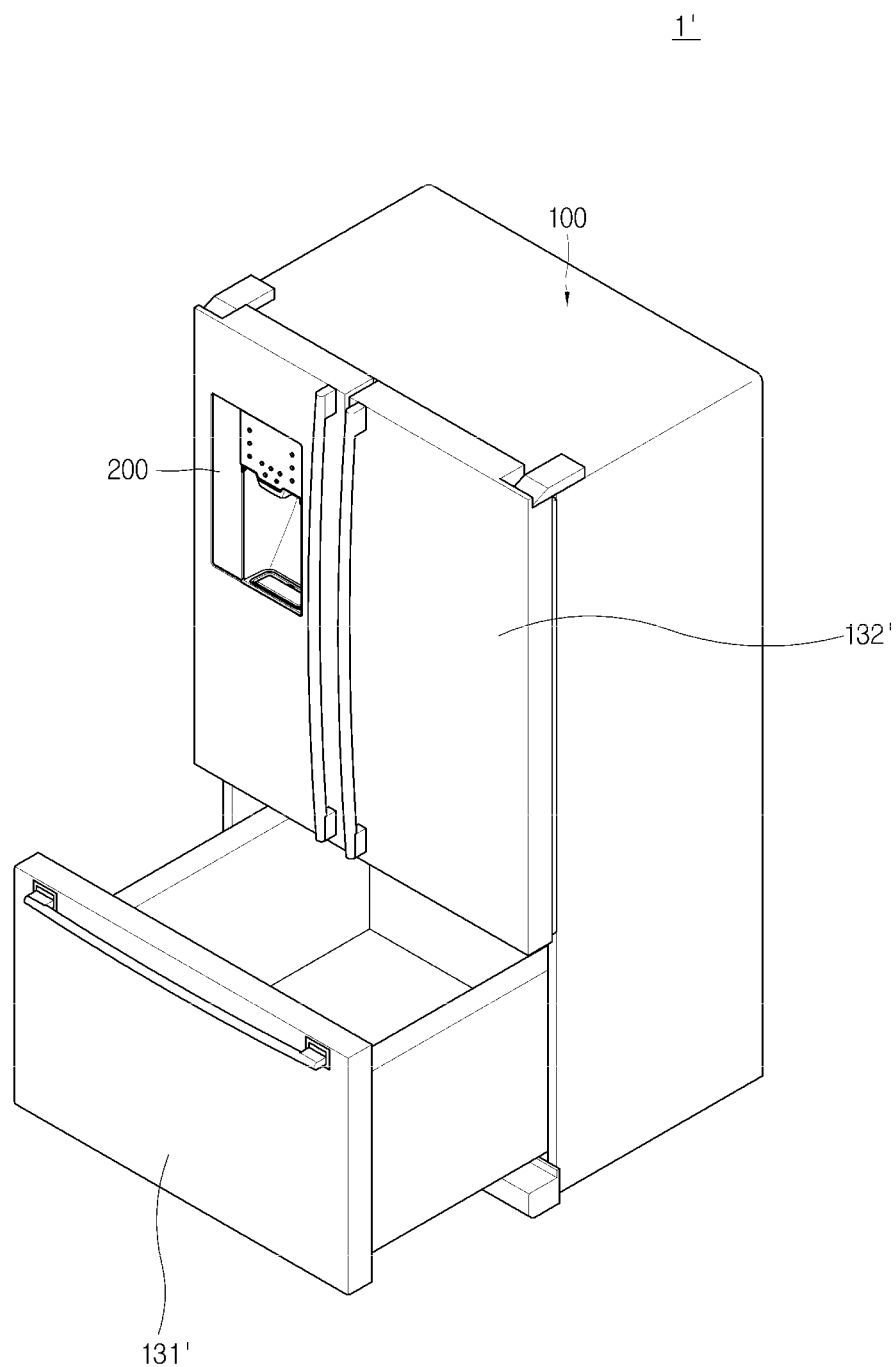
FIG. 2 is another view illustrating a refrigerator having the carbonated water production unit according to an embodiment.

FIG. 2 is another view illustrating a refrigerator having the carbonated water production unit according to an embodiment.

Unlike the example of the refrigerator shown in FIGS. 1A and 1B, as shown in FIG. 2, an accommodation space inside a main body may be vertically partitioned by an intermediate partition in a refrigerator 1'.

The main body 100 of such a refrigerator may include a refrigerator compartment, i.e., an upper space of a storage room and a freezer compartment, i.e., a lower space of the storage room and further may include a door 132' for the refrigerator compartment which opens or closes the refrigerator compartment and a door 131' for the freezer compartment which opens or closes the freezer compartment.

The door 132' for the refrigerator compartment may be rotatably provided in a two-door type, and the door 131' for the freezer compartment may be able to slide forward and provided in a drawer type.

An icehouse for making ice may be provided in the refrigerator compartment, and a tank for storing water supplied from an external water supply source may also be provided therein.

The water of the tank may be water purified by a water purification filter.

Such a refrigerator may further include a dispenser 200 provided on any one door for the refrigerator compartment among a pair of doors for the refrigerator compartment and configured to supply water and carbon dioxide for producing water in the tank, ice in the icehouse, or carbonated water without a user opening the door.

That is, the dispenser 200 may be provided in a French door type refrigerator (FDR) shown in FIG. 2, as well as a refrigerator having a side-by-side type door shown in FIGS. 1A and 1B.

The dispenser 200 provided in the above-described refrigerator may include a carbonated water production unit 200a which supplies water and carbon dioxide for producing carbonated water, and the dispenser 200 may further include a water purifier for supplying purified water and an ice supplier for receiving and discharging ice in addition to the carbonated water production unit.

Such a dispenser 200 will be described with reference to FIGS. 3 to 6.

Figure 3:
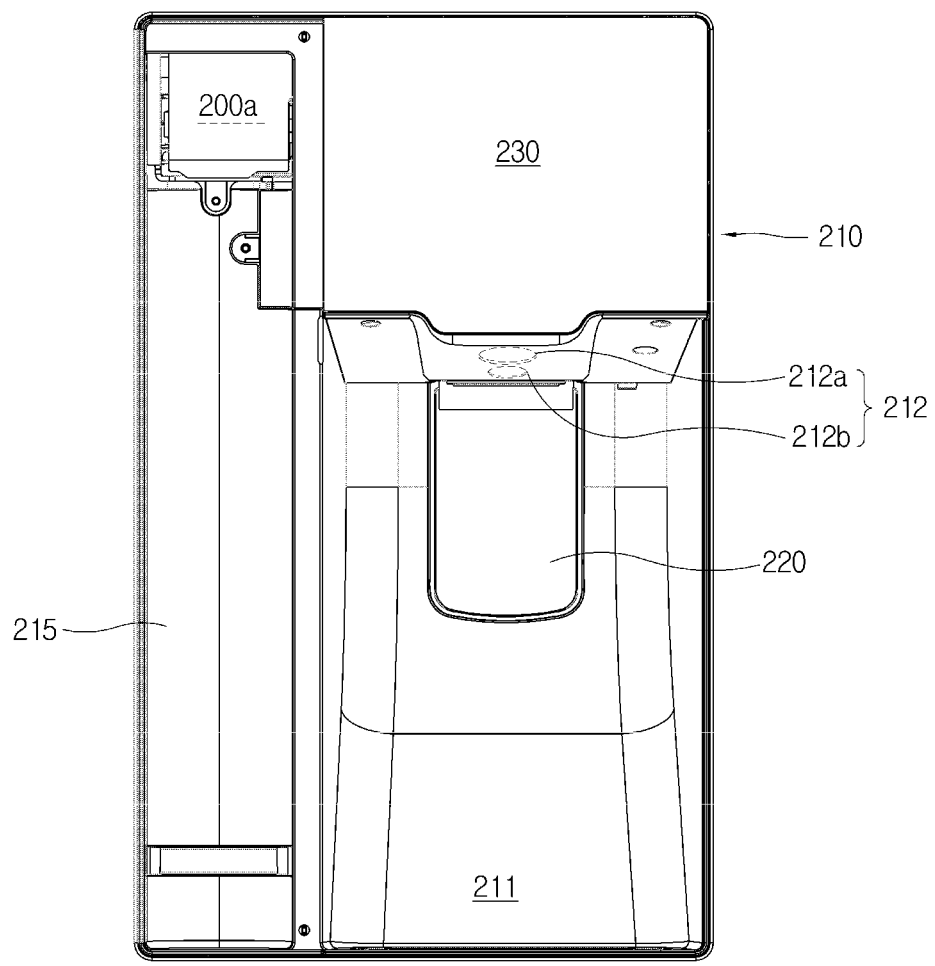
FIG. 3 is a perspective view of a dispenser having the carbonated water production unit according to an embodiment.
Figure 4:
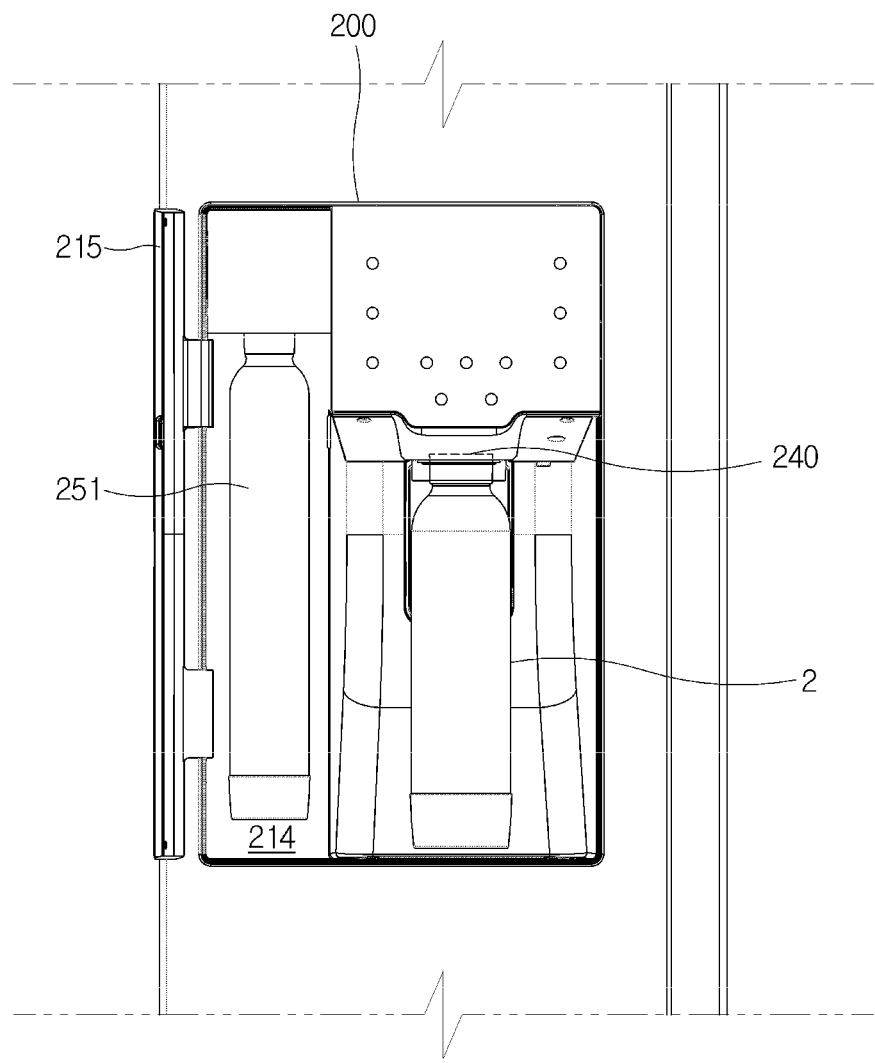
FIG. 4 is a view illustrating when a container is coupled with the dispenser shown in FIG. 3.
Figure 5:
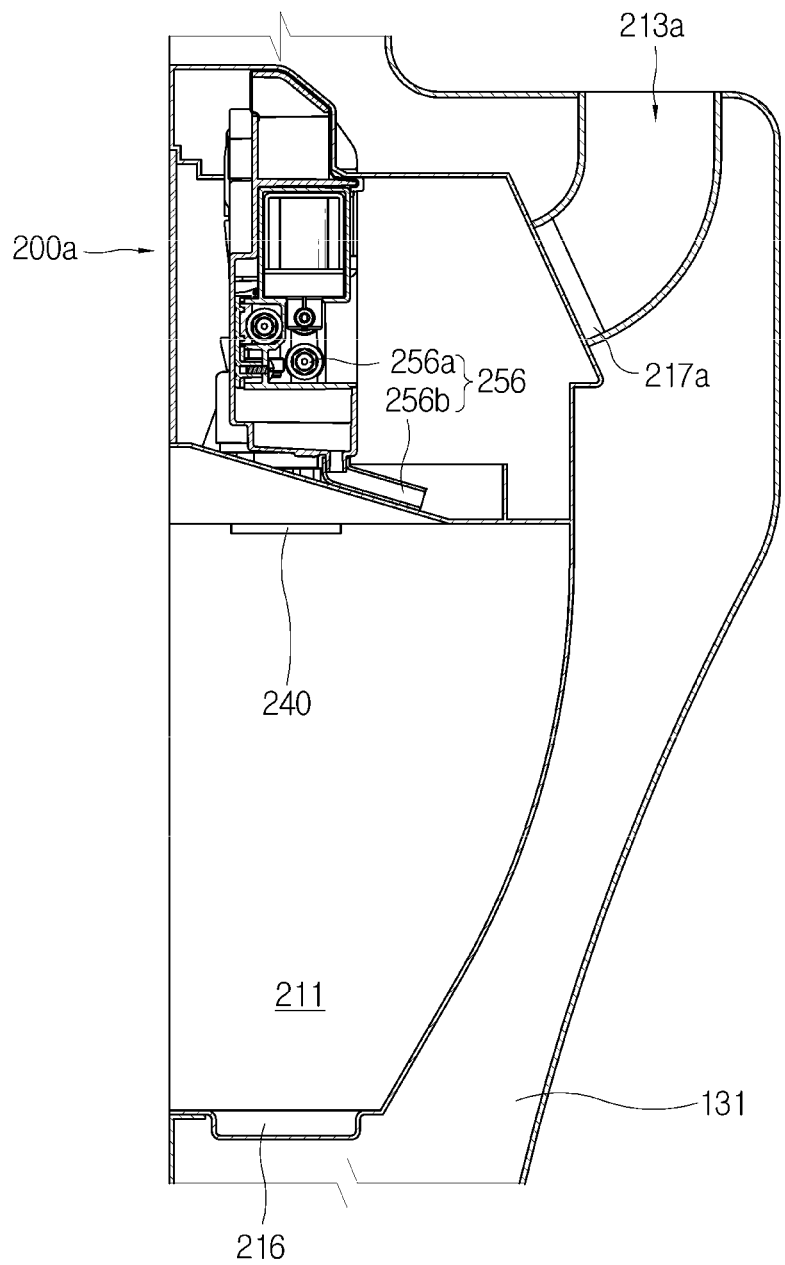
FIG. 5 is a cross-sectional view of the dispenser shown in FIG. 3.

FIG. 3 is a perspective view of a dispenser having the carbonated water production unit according to an embodiment, FIG. 4 is a view illustrating when a container 2 is coupled with the dispenser shown in FIG. 3, and FIG. 5 is a cross-sectional view of the dispenser shown in FIG. 3 and FIGS. 3 to 5 are views for describing the dispenser provided in the refrigerator shown in FIGS. 1A and 1B.

As shown in FIG. 3, the dispenser 200 may include a housing 210 disposed in a receiving groove of a door 131 for a freezer compartment and a lever 220 which is operated by a user when ice or purified water is discharged and generates a signal for a discharge command when the user operates the lever 220, and the dispenser 200 further may include a user interface 230 which receives information on carbonated water production, information on purified water discharge, and information on ice discharge and outputs the information on carbonated water production, the information on purified water discharge, or the information on ice discharge.

In more detail, as shown in FIGS. 3 and 4, the housing 210 may include a concave part 211 which is recessed from a front surface toward an inner side to form a space for receiving an object and an outlet 212 which is disposed on an upper side of the concave part 211 and discharges the object.

The outlet 212 may include a first outlet 212a which discharges water and carbon dioxide for producing carbonated water and a second outlet 212b which discharges purified water or ice.

A first water supply pipe for supplying water and a nozzle module which injects carbon dioxide for producing carbonated water may be disposed at the first outlet 212a, and a second water supply pipe for discharging purified water and an ice supply pipe 213a for discharging ice may be disposed at the second outlet 212b.

As shown in FIG. 4, the housing 210 of the dispenser may further include a receiving part 214 for accommodating a cylinder 251 in which carbon dioxide is stored, and a cover 215 for opening or closing the receiving part 214 may be provided on the receiving part 214.

Here, the cylinder 251 may be mounted to be detachable in the receiving part 214.

Thus, a user may replace the cylinder 251 with another cylinder when carbon dioxide in the cylinder 251 is consumed.

The dispenser 200 is provided inside the housing 210 and further may include a first water supply pipe for supplying water and a carbonated water production unit 200a having a nozzle module for injecting carbon dioxide.

The carbonated water production unit 200a is provided at the first outlet 212a and further may include a coupler 240 to which the container 2 is coupled to be detachable.

That is, the container 2 may be detachably coupled to the carbonated water production unit 200a of the dispenser 200 using the coupler 240 provided at the first outlet 212a.

Such a container 2 receives water and carbon dioxide after the container 2 is coupled to the carbonated water production unit 200a, and at this point, the carbon dioxide injected in the water is dissolved, and thus carbonated water may be produced immediately.

The carbonated water production unit 200a may be provided inside the housing 210 and further may include a discharge part 256 (256a and 256b) which discharges at least one of carbon dioxide, carbonated water, and water overflowing from the container 2 during the production of carbonated water to the outside of the container 2.

Here, the discharge part 256 may include a valve 256a configured to discharge at least one of water, carbonated water, and carbon dioxide in the container to the outside thereof and a discharge channel 256b provided with a channel through which at least one of the water, the carbonated water, and the carbon dioxide in the container discharges to the outside.

In addition, the dispenser 200 is provided in the housing 210 and provided on a lower side of the concave part 211 and may further include a water collecting part 216 for collecting water discharged through the discharge channel 256b.

Furthermore, the dispenser 200 is provided on the ice supply pipe 213a and may further include a regulation member 217a which opens or closes the ice supply pipe 213a to regulate ice discharge.

As the regulation member 217a is opened or closed according to an operation of the lever 220, ice is discharged during an opening operation and ice discharge is blocked during a closed operation.

The carbonated water production unit 200a for producing carbonated water using the detachably coupled container 2 will be described with reference to FIG. 6.

Figure 6:
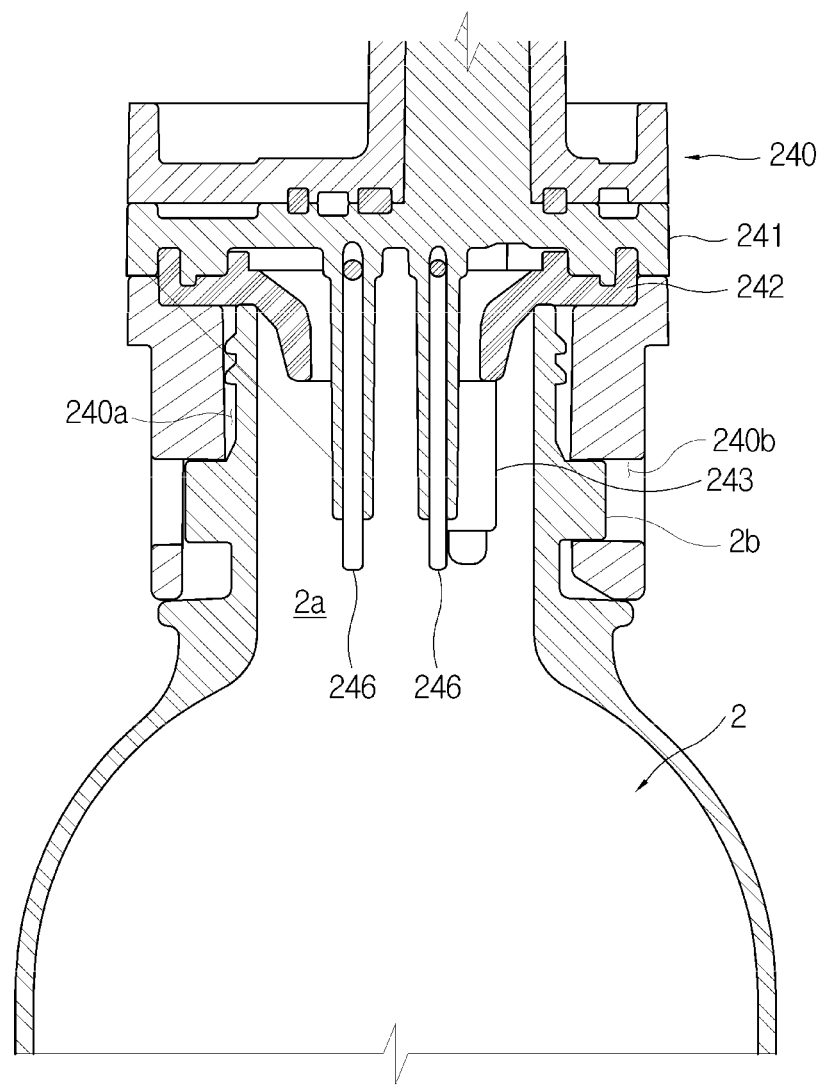
FIG. 6 is a structural diagram when the carbonated water production unit of the dispenser shown in FIG. 4 is coupled with a container.
Figure 7A:
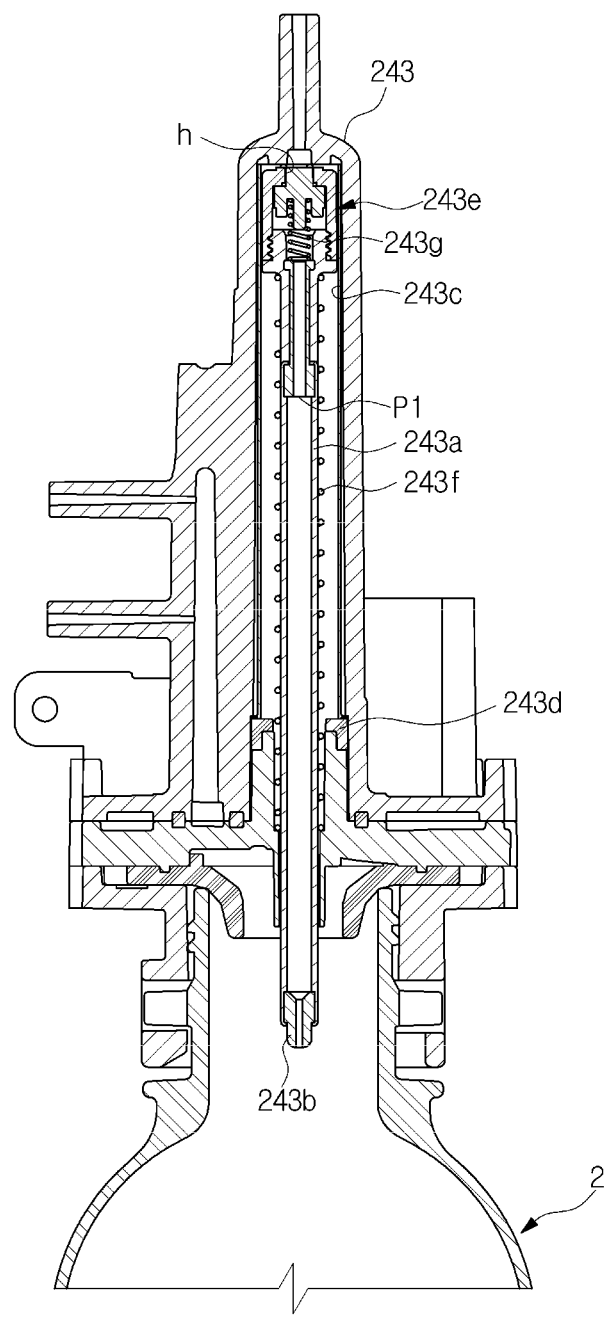
FIGS. 7A to 7D are views illustrating a nozzle module inside the carbonated water production unit shown in FIG. 6.
Figure 7B:
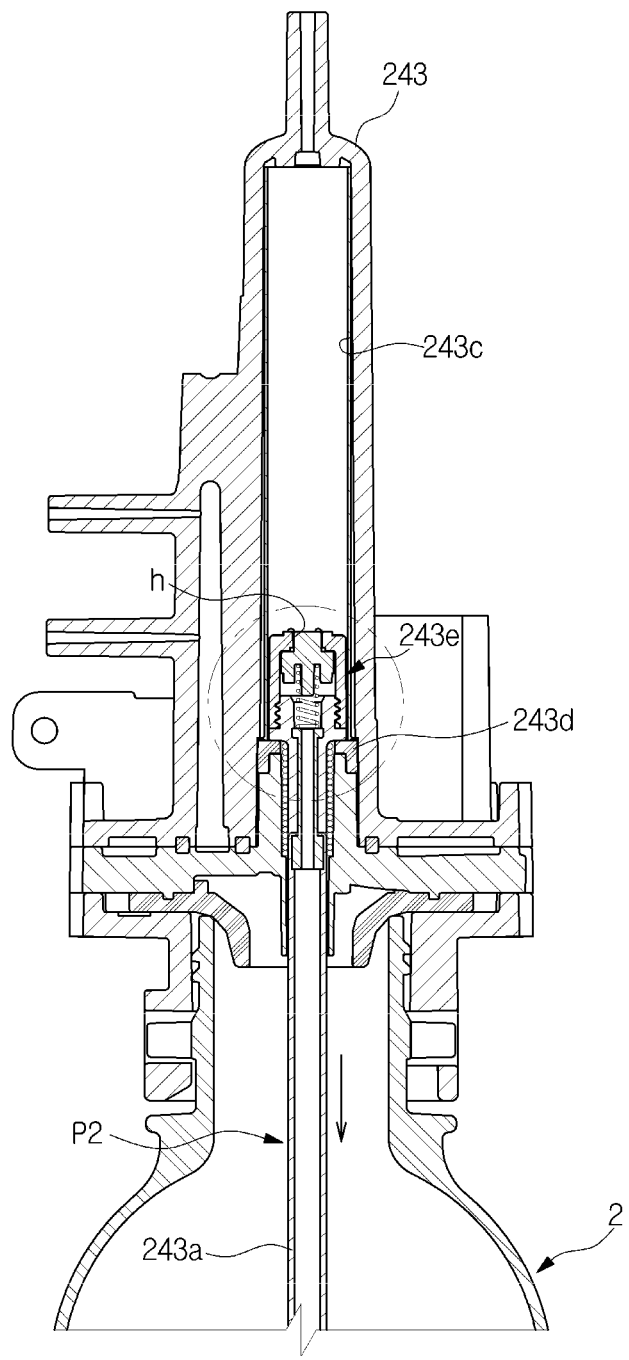
Figure 7C:
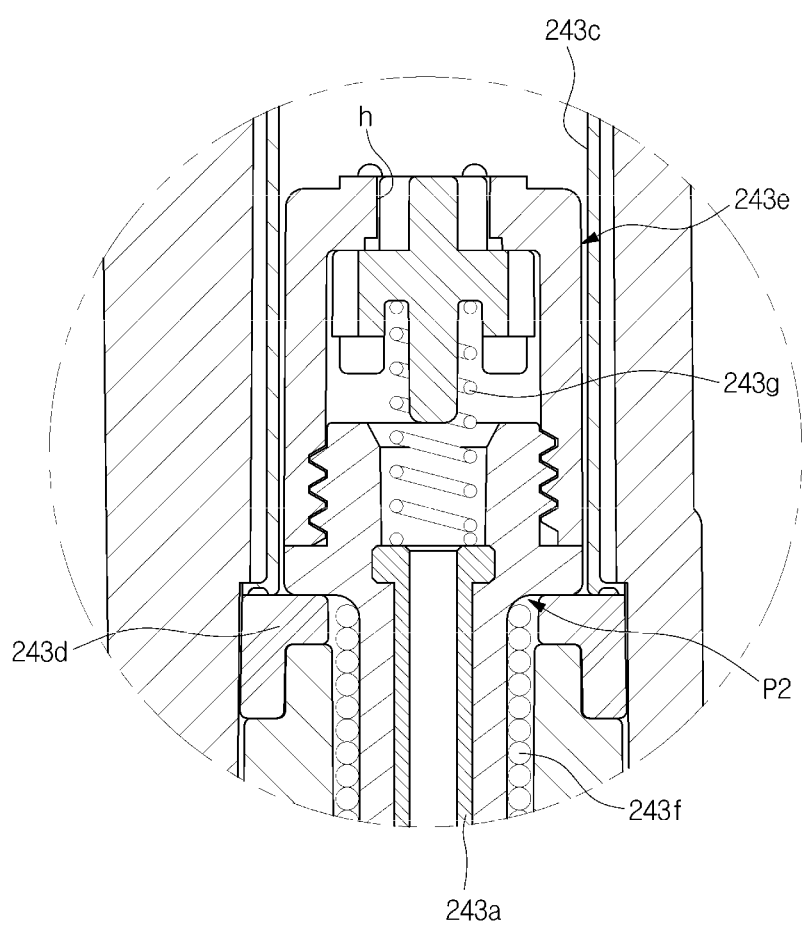
Figure 7D:
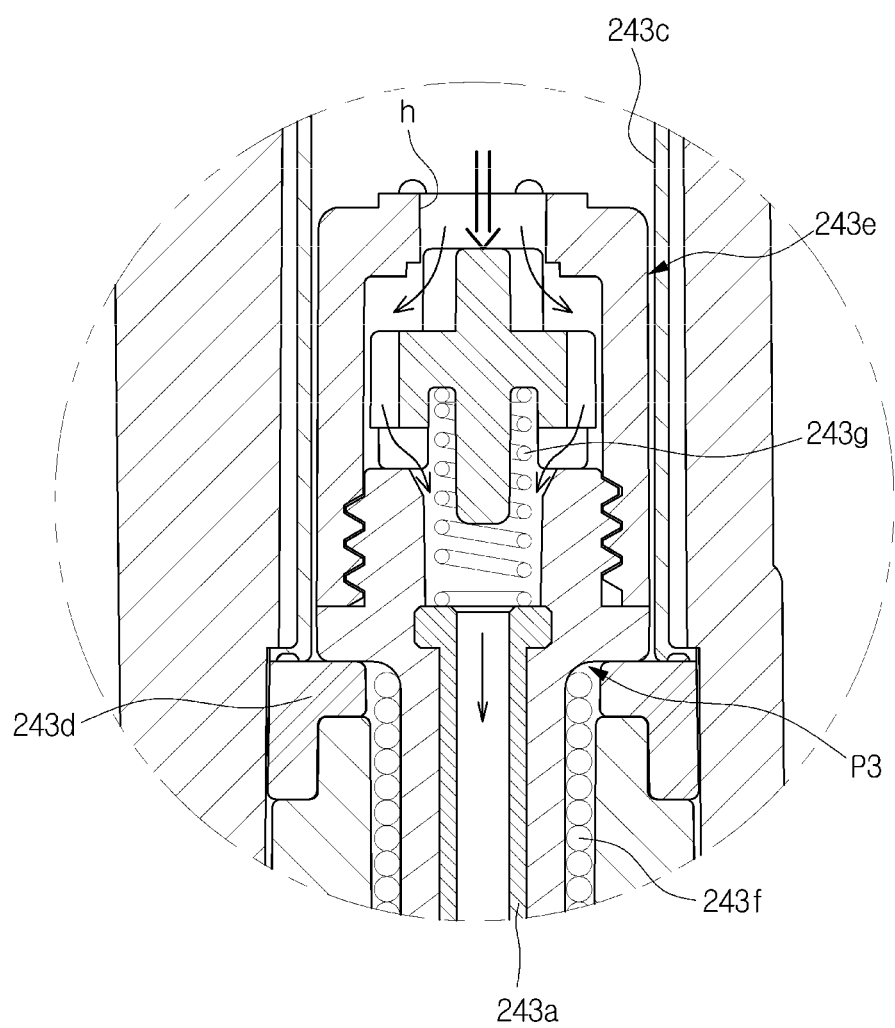

FIG. 6 is a structural diagram when the carbonated water production unit of the dispenser shown in FIG. 4 is coupled with a container.

As shown in FIG. 6, the carbonated water production unit 200a may include a coupler 240 to which a container 2 is detachably coupled. Here, the coupler 240 may be disposed at a first outlet 212a of the dispenser.

The coupler 240 may include a body 241 provided with an insertion groove 240a into which an inlet 2a of the container 2 is inserted and having a mounting groove 240b in which a protrusion 2b of the container 2 is mounted and a packing member 242 disposed in the insertion groove 240a of the body 241 and pressed against the inlet 2a of the container 2 to prevent water and carbon dioxide inside the container 2 from leaking to the outside while inserting the container 2.

A nozzle module 243 movably disposed on the body 241 and configured to inject carbon dioxide may be disposed on the coupler 240.

The packing member 242 may include a plurality of holes and the nozzle module 243 may be disposed to pass through any one hole of the plurality of holes of the packing member 242.

That is, the nozzle module 243 performs a reciprocating movement toward the inside of the container 2 but moves by a distance in which the nozzle module 243 may be submerged in water inside the container.

Here, the nozzle module 243 moves toward a lower portion of the inside of the container 2 by a pressure of carbon dioxide while injecting the carbon dioxide and moves toward an upper portion of the container 2 by decreasing the pressure of the inside of the nozzle module when the injection of the carbon dioxide is completed.

A configuration of the nozzle module 243 will be described with reference to FIGS. 7A to 7D.

The nozzle module 243 may include a nozzle pipe 243a provided with a channel through which carbon dioxide flows and provided to allow a reciprocating movement toward the inside of the container, an injection nozzle 243b provided on one end of the nozzle pipe 243a to be submerged in water inside the container, a movement path 243c on which the nozzle pipe 243a is moved by inflowing carbon dioxide, and a stopper 243d which is provided on the movement path 243c and restricts the movement of the nozzle pipe 243a.

The nozzle module 243 further may include an injection valve 243e provided on the other end of the nozzle pipe 243a.

Such an injection valve 243e opens or closes an inflow hole h through which carbon dioxide inflows.

In more detail, carbon dioxide flowing into the nozzle module 243 flows into the nozzle pipe 443a via the inflow hole h, and at this moment, the injection valve 243e opens the inflow hole h when a pressure of the inside of the nozzle module 243 is a predetermined pressure or more due to the inflow of the carbon dioxide, and otherwise closes the inflow hole h when the pressure of the carbon dioxide is not applied and the pressure of the inside of the nozzle module 243 is less than the predetermined pressure.

The nozzle module 243 surrounds the nozzle pipe 243a and further may include a first elastic member 243f for elastically supporting the nozzle pipe 243a.

In more detail, the first elastic member 243f may be disposed so that one end is supported by the injection valve 243e, and the other end is supported by the stopper 243d.

The first elastic member 243f elastically supports the nozzle pipe 243a so that an upper portion of the nozzle pipe 243a is maintained at a standby position P1 before the pressure of carbon dioxide in the nozzle module 243 becomes a first pressure.

Further, when the pressure of the carbon dioxide in the nozzle module 243 becomes the first pressure, the first elastic member 243f is compressed, and the upper portion of the nozzle pipe 243a moves until the movement thereof is restricted by the stopper 243d.

In more detail, when the nozzle pipe 243a is positioned at the standby position P1, the injection nozzle 243b for carbon dioxide is provided to be positioned above a surface of water supplied to the container 2.

That is, in both cases where the carbon dioxide is supplied or not supplied, when the pressure of the inside of the nozzle module is less than the first pressure, the upper portion of the nozzle pipe 243a is positioned at the standby position P1. When the carbon dioxide is supplied to the nozzle module 243 and the pressure of the inside of the nozzle module 243 becomes the first pressure, the upper portion of the nozzle pipe 243a moves from the standby position P1 so that the injection nozzle 243b is positioned under a surface of purified water supplied from the container 2.

That is, the injection nozzle 243b is positioned at a supply enabled position P2.

Then, when carbon dioxide is supplied into the nozzle module 243 and the pressure of the inside of the nozzle module 243 becomes a second pressure greater than the first pressure, the upper portion of the nozzle pipe 243a further moves from the supply enabled position P2 to inject the carbon dioxide via the carbon dioxide injection nozzle 243b, and this injection position is referred to as a supply position P3.

The nozzle module 243 may further include a second elastic member 243g for elastically supporting the injection valve 243e.

The second elastic member 243g is provided so that one end is supported by the injection valve 243e, and the other end is supported by the nozzle pipe 243a.

When the pressure of the carbon dioxide in the nozzle module 243 becomes the second pressure, the second elastic member 243g elastically supports the injection valve 243e, so that the upper portion of the nozzle pipe 243a moves from the supply enabled position P2 to the supply position P3.

That is, when the pressure of the inside of the nozzle module 243 is less than the second pressure, the second elastic member 243g is provided to elastically support the injection valve 243e in a compressed state within a predetermined section rather than a free state so that the upper portion of the nozzle pipe 243a is maintained at the supply enabled position P2.

When the pressure of the carbon dioxide in the nozzle module 243 becomes the second pressure, the second elastic member 243g is compressed and the injection valve 243e opens the inflow hole h.

At this point, carbon dioxide inside the nozzle module 243 passes through the open inflow hole h and flows into the flow nozzle pipe 243a and is injected into purified water via the injection nozzle 243b positioned under the surface of the purified water inside the container 2.

As described above, in a process of producing carbonated water in the container 2, since carbon dioxide is directly injected into purified water supplied to the container 2, the solubility of carbon dioxide may be improved. Further, the production efficiency of the carbonated water may be improved by the above-described process.

Then, when the supply of the carbon dioxide stops from the nozzle module 243, the compressed second elastic member 243g and first elastic member 243f are restored and the nozzle pipe 243a moves from the supply position P3 to the standby position P1.

There is no limit for the first pressure and the second pressure which may vary according to production conditions of carbonated water. For example, the first pressure may be set to 0.5 bar, and the second pressure may be set to 1.5 bar.

Since the second pressure is greater than the first pressure, an elastic force of the second elastic member 243g may be provided to be greater than an elastic force of the first elastic member 243f.

A first water supply pipe 244 and a pressure regulation pipe 245 may be disposed at the body 241 of the coupler 240.

Further, a water level detector 246 for detecting a water level of the container 2 and a coupling detector 247 for detecting whether the container 2 is coupled to the coupler 240 may be selectively disposed on the body 241 of the coupler 240.

Here, the water level detector 246 is a moisture detector for detecting an overflow of water inside the container and may include electrodes.

Further, the coupling detector 247 may include a reed switch or micro switch.

A configuration of the carbonated water production unit 200a will be described in detail with reference to FIG. 8.

Figure 8:
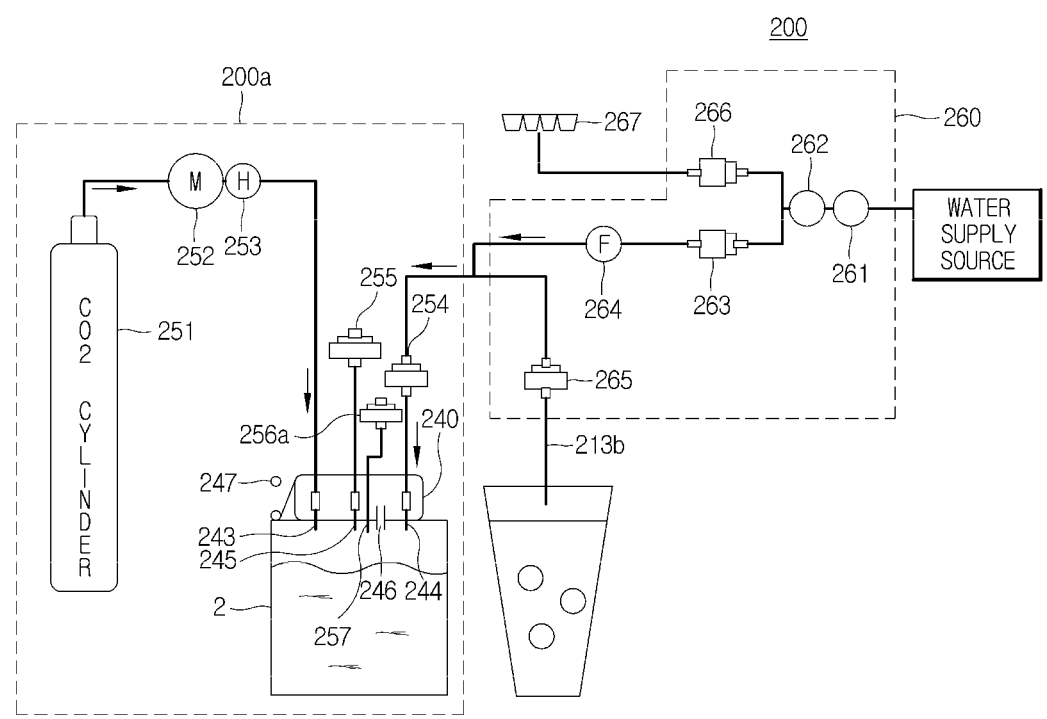
FIG. 8 is a configuration diagram of a carbonated water production unit according to an embodiment.

FIG. 8 is a configuration diagram of the carbonated water production unit 200a according to an embodiment and is illustrated together with a configuration of a water purifier 260 connected to the carbonated water production unit.

The carbonated water production unit 200a may include a cylinder 251 which stores carbon dioxide and supplies the stored carbon dioxide during production of carbonated water, a regulation member 252 which is disposed at a channel between an outlet of the cylinder 251 and a nozzle module 243 and regulates a flow of the carbon dioxide flowing from the cylinder 251 to the nozzle module 243, and a pressure detector 253 for detecting the pressure of the carbon dioxide discharged from the cylinder 251.

The cylinder 251 may store carbon dioxide having a high pressure of about 45 to 60 bar.

The regulation member 252 may include a solenoid valve which opens or closes a discharge channel of carbon dioxide by an electrical signal.

In this case, the pressure detector 253 may be a carbon dioxide pressure sensor which detects a pressure of carbon dioxide discharged from the cylinder 251. The carbon dioxide pressure sensor may include a pressure switch which outputs a low pressure detection signal generated when the pressure of carbon dioxide becomes a predetermined pressure or less.

Furthermore, the regulation member 252 may include a motor for opening or closing an outlet of the cylinder 251 and in this case, may further include a rotation angle detector for detecting a rotation angle of the motor. Here, the rotation angle detector may include a hole sensor.

The carbonated water production unit 200a may include a first valve 254 which is provided on a first water supply pipe 244 and regulates an amount of purified water supplied from an external tank to a container 2, a second valve 255 which is provided on a pressure regulation pipe 245 and regulates a pressure inside of the container 2, and a third valve 256a which is a discharge valve and provided on a discharge pipe 257 and discharges at least one of water, carbonated water, and carbon dioxide inside the container 2 to the outside.

Furthermore, the first valve may be a DC valve, the second valve may be a vent valve, and the third valve may be a relief valve.

The vent valve is a valve provided to prevent an excessive pressure of the inside of the container 2 while injecting carbon dioxide into the container 2.

Specifically, when the pressure of carbon dioxide in the container 2 is more than a predetermined pressure, the vent valve 255 is opened to discharge the carbon dioxide to the outside.

Furthermore, the second valve 255 may be provided with a mechanical valve which opens automatically when a pressure of the inside of the container is a predetermined pressure or more.

When purified water having more than a predetermined amount is supplied or carbonated water having more than a predetermined amount is produced in a process of producing the carbonated water, the relief valve 256a automatically discharges an overflow of purified water, carbonated water, and carbon dioxide.

Furthermore, when the purified water having more than the predetermined amount is supplied or the carbonated water having more than the predetermined amount is produced, the third valve 256a may be provided with an electronic valve such as a solenoid valve which is opened or closed based on a control signal.

The water purifier 260 may be connected to an external water supply source such as tap water and include a tank 262 for storing purified water purified through a purified water filter 261, a fourth valve 263 which is provided at a channel connected to the tank 262 and supplies the stored purified water to the tank 262 or blocks the supply of the purified water, a flow rate detector 264 for detecting an amount of the purified water supplied through the fourth valve 263, and a fifth valve 265 which is provided at a channel between the fourth valve 263 and the second water supply pipe 213b and supplies the purified water to the second water supply pipe 213b or blocks the supply of the purified water.

The water purifier 260 may further include a sixth valve 266 which is provided at a channel between the tank 262 and an ice making unit 267 of an icehouse and supplies the purified water inside the tank 262 to the ice making unit 267 of the icehouse or blocks the supply of the purified water.

Here, each of the fourth valve 263 and the sixth valve 266 may include a solenoid valve and the fifth valve 265 may include a DC valve.

Furthermore, water of the water supply source may not be purified and directly supplied to the second water supply pipe 213b and the ice making unit 267.

In this case, the fourth valve 263 and the sixth valve 266 block a strong water pressure of the water supply source and regulate water supply for the second water supply pipe 213b and ice making unit 267.

Furthermore, a channel switch valve is provided at the water supply source and may also supply purified water to a first water supply pipe of the carbonated water production unit or a second water supply pipe of the water purifier.

As described above, when the channel switch valve is applied, the channel switch valve may be implemented as a three-way valve including an inlet connected to the water supply source, a first outlet connected to the ice making unit 267, and a second outlet connected to the first water supply pipe of the carbonated water production unit or the second water supply pipe of the water purifier.

The channel switch valve may supply purified water supplied from the water supply source to at least one of the carbonated water production unit 200a, the water purifier 260, and the ice making unit 267.

The purified water filter 261 receives water from the water supply source using a pressure of water inside the water supply source and purifies the supplied water to supply to the tank 262.

A storage part of the ice making unit 267 is connected to an ice supply pipe 213a of an ice supplier of a dispenser and discharges stored ice to the ice supply pipe 213a of the ice supplier in response to an ice discharge command.

Figure 9:
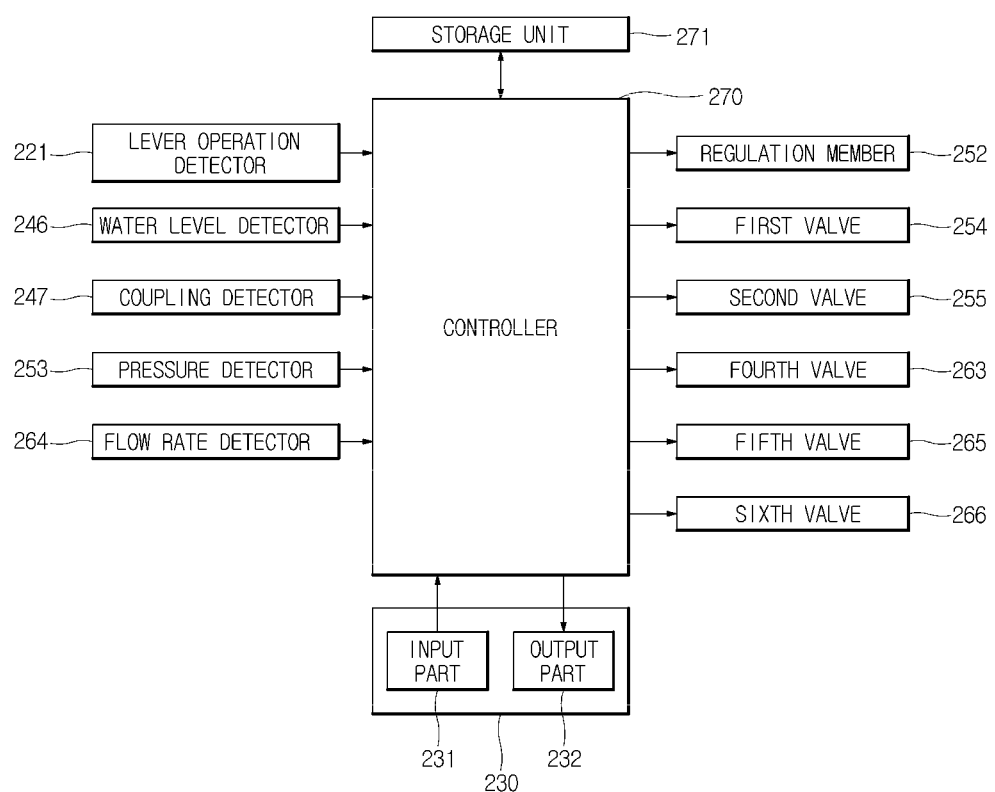
FIG. 9 is a configuration diagram for controlling a dispenser having the carbonated water production unit according to an embodiment.

FIG. 9 is a configuration diagram for controlling a dispenser having the carbonated water production unit according to one embodiment.

A refrigerator may include a user interface 230, a plurality of detectors, a controller 270, and a storage part 271 for a configuration of controlling the dispenser.

The user interface 230 may include an input part 231 for receiving an input of a command for an operation of the refrigerator and an output part 232 for displaying information on the operation of the refrigerator.

The input part 231 and output part 232 of the user interface 230 may be formed integrally.

Figure 10:
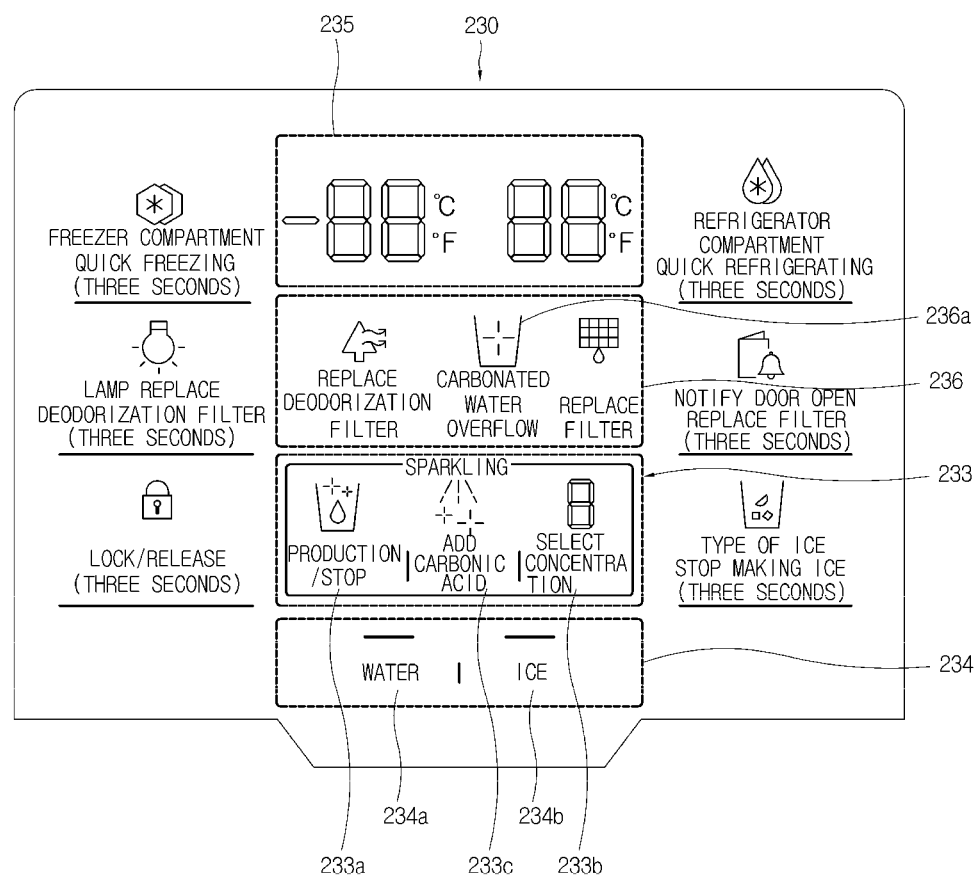
FIG. 10 is a view illustrating a user interface provided on a refrigerator having the carbonated water production unit according to an embodiment.

Such a user interface 230 will be described with reference to FIG. 10, FIGS. 11A, and 11B.

The input part 231 may be provided with a plurality of buttons or a touch panel.

Figure 11A:
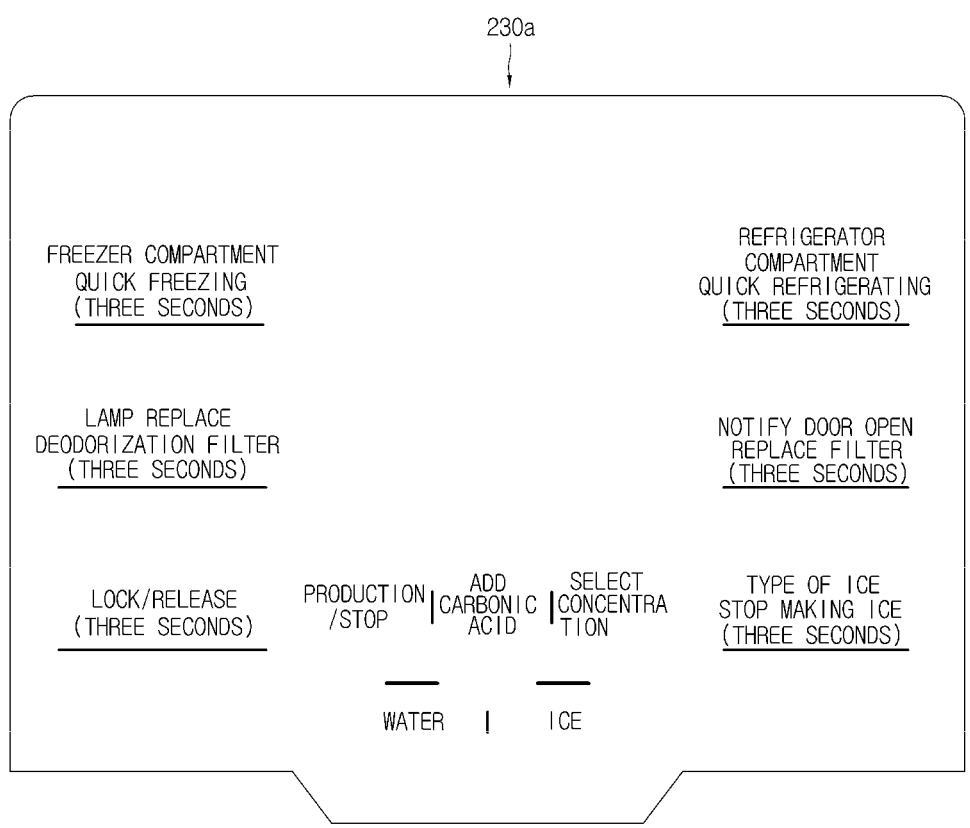
FIGS. 11A and 11B are structural diagrams of the user interface provided on the refrigerator having the carbonated water production unit according to an embodiment.
Figure 11B:
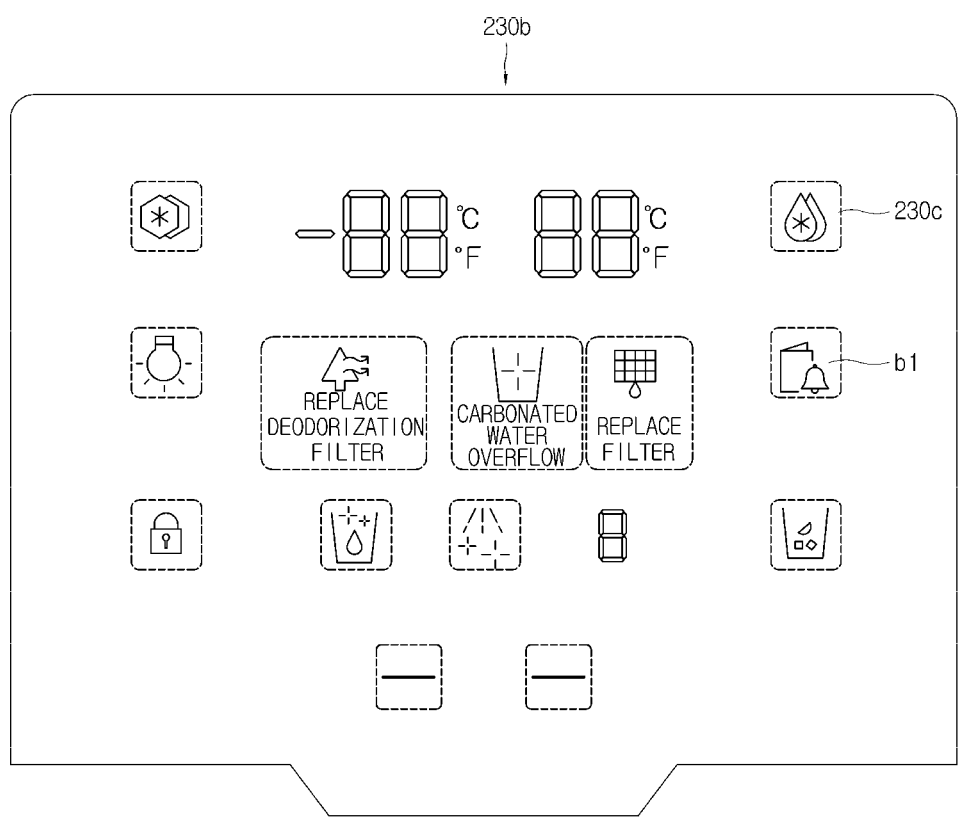

As shown in FIGS. 11A and 11B, the output part 232 may include a display film 230a on which texts are printed, an inlay film 230b on which texts and icon b1 are engraved, and a lamp 230c which is disposed on rear surfaces of the texts and icon of the inlay film to project light to the texts and icon of the inlay film.

That is, as the light of the lamp 230c projects to the outside through the texts and icon of the inlay film, a user may obtain information on the operation of the refrigerator using the user interface 230.

Furthermore, when the input part 231 is provided with the plurality of buttons (not shown), the plurality of buttons may be disposed at positions corresponding to positions of the texts and icon b1 of the inlay film 230b.

The user interface 230 may include a first input and output part 233 which receives an operation command depending on carbonated water production and displays operation information depending on the carbonated water production and a second input and output part 234 which receives a command for discharging purified water or ice and displays discharge information of the purified water or ice.

In more detail, the first input and output part 233 may include a first carbonated water information region 233a where a production command or a stop command for carbonated water is input by a user and whether the carbonated water is produced is displayed, a second carbonated water information region 233b where concentration of the carbonated water is input by the user and the input concentration of the carbonated water is displayed, and a third carbonated water information region 233c where a command for adding carbonic acid is input by the user and whether the carbonic acid is added is displayed.

The second carbonated water information region 233b may include a seven-segment display for displaying the concentration of the carbonated water with a number.

The second input and output part 234 may include a first discharge information region 234a where a command for discharging purified water is input and information on the discharge of the purified water is displayed and a second discharge information region 234b where a command for discharging ice is input and information on the discharge of the ice is displayed.

Further, the user interface 230 further may include a third input and output part 235 for receiving target temperatures of a freezer compartment and a refrigerator compartment and displays the input target temperatures of the freezer compartment and the refrigerator compartment.

The third input and output part 235 may include a plurality of seven-segment displays for displaying the target temperatures of the freezer compartment and the refrigerator compartment.

The user interface 230 may include a warning output part 236 for outputting warning information.

The warning output part 236 may include a water overflow warning display part 236a for displaying an overflow of water in the container 2 while producing carbonated water.

Further, the user interface 230 may receive input for functions such as special freezing having a target temperature of 30° C. below zero or lower, sterilization or deodorization, etc., and may display operation information of the input functions.

Furthermore, the input part 231 may be implemented as a touch panel and the output part 232 may be implemented as a flat display panel such as a liquid crystal display (LCD), a plasma display panel (PDP), an organic light-emitting diode (OLED), etc.

That is, the user interface 230 may be implemented as a touch screen integrally formed with a touch panel and a flat display panel.

The plurality of detectors may include a lever operation detector 221 for detecting whether a lever 220 which instructs discharge of purified water or water is pressurized, a water level detector 246 for detecting a level of water supplied into the container 2, a coupling detector 247 for detecting whether the container 2 is coupled to a coupler 240 of the carbonated water production unit, a pressure detector 253 for detecting a pressure of carbon dioxide discharge, and a flow rate detector 264 for detecting an amount of purified water supplied from a tank.

Here, each of the detectors 221, 246, 247, 253, and 264 transmits a detected signal to the controller 270.

The controller 270 controls an operation of a dispenser 200 based on signals detected from the plurality of detectors and a signal of the input part 231 of the user interface.

Here, the control of the operation of the dispenser 200 may include controlling a first valve 254, a second valve 255, a fourth valve 263, a fifth valve 265, and a sixth valve 266 to be opened or closed and may include controlling an operation of a regulation member 252.

In more detail, the controller 270 determines a detected signal of the coupling detector 247 to determine whether the container 2 is coupled to the coupler 240, and when it is determined that the container 2 is coupled to the coupler 240, the controller 270 controls the first input and output part 233 to be activated.

The controller 270 controls a lamp 230c provided on the first input and output part 233 to be turned on when the first input and output part 233 is controlled to be activated.

The controller 270 determines whether the first carbonated water information region 233a is selected while the first input and output part 233 are activated, and when it is determined that the first carbonated water information region 233a is selected, the controller 270 controls the opening of the first valve 254 and the fourth valve 263 to supply purified water stored in the tank 262 to the container 2.

The determination of whether the first carbonated water information region 233a is selected may include determining whether a signal corresponding to a command for carbonated water production is input to the first input and output part 233.

The controller 270 determines an amount of purified water supplied to the container 2 based on a signal detected from the flow rate detector 264 while supplying the purified water, and when the amount of the determined purified water is a preset amount, the controller 270 controls the closing of the first valve 254 and the fourth valve 263 to block the supply of the purified water.

The controller 270 controls the purified water to be supplied for a preset time while supplying the purified water, and when the supply of the purified water is completed, the controller 270 may control the first valve 254 and the fourth valve 263 to be closed.

Furthermore, the controller 270 controls the opening of the second valve 255 before supplying the purified water in order to prevent an increase in the pressure of the container 2 according to the supply of the purified water, and when the supply of the purified water is completed, the controller 270 controls the second valve 255 to be closed.

Thus, while supplying the purified water, a channel of the pressure regulation pipe 245 inserted into the container 2 is open.

That is, when the command for carbonated water production is input and the second valve 255 is opened completely, the controller 270 controls the opening of the first valve 254 and the fourth valve 263.

When the supply of the purified water is completed, the controller 270 determines whether a water level of the purified water inside the container 2 is a predetermined water level or more, and when the water level of the purified water inside the container 2 is determined to be the predetermined water level or more, the controller 270 controls the production of the carbonated water to be stop.

The determination of whether the water level of the purified water inside the container 2 is the predetermined water level or more may include determining whether the water level of the purified water inside the container is the predetermined water level or more due to the pre-stored water in the container before supplying the purified water or whether the purified water having less than the predetermined water amount is supplied to the container by the flow rate detector 264.

Here, the stopping of carbonated water production may include controlling a water supply to be stopped, controlling injection of carbon dioxide to be stopped, and controlling a water overflow warning.

At this moment, the controller 270 controls the first input and output part 233 to be deactivated and controls an operation of a lamp disposed on the water overflow warning display part 236a of the warning output part 236, thereby turn on a water overflow icon. Accordingly, a user may recognize a water overflow situation in the container 2.

Therefore, the purified water in the container 2 may be maintained with a preset fixed amount based on the signal detected from the flow rate detector 264 and the signal detected from the water level detector 246.

Here, the preset fixed amount may be an amount set at manufacturing or an amount set by a user.

Furthermore, when the third valve 256a is provided with a solenoid valve, the controller 270 may control the opening of the third valve 256a so that water is discharged to the outside when a water overflow of the container is detected.

When the supply of the purified water is completed and a water level of the purified water inside the container 2 is determined to be less than the predetermined water level, the controller 270 controls an operation of the regulation member 252 so that carbon dioxide inside the cylinder 251 is discharged.

At this moment, the cylinder 251 may discharge a preset amount of carbon dioxide at a preset pressure based on information detected from the pressure detector.

Furthermore, when the regulation member 252 is a motor, a rotation angle of the regulation member 252 may be controlled based on a signal detected from a rotation angle detector.

In addition, when the injection of carbon dioxide is completed, the controller 270 controls an operation of the regulation member 252, so that the supply of the carbon dioxide is blocked.

When the injection of the carbon dioxide is completed, the controller 270 controls the opening of the second valve 255 to decrease the pressure of the inside of the container 2.

When the production of the carbonated water is completed, the controller 270 may control information on the completion of the production of the carbonated water to be displayed.

The controller 270 determines whether the first carbonated water information region 233a is reselected while producing carbonated water, and when it is determined that the first carbonated water information region 233a is reselected, the controller 270 controls the production of the carbonated water to be stopped.

Here, the determination of whether the first carbonated water information region 233a is reselected may include determining whether a signal corresponding to a stop command for the production of the carbonated water is input.

The controller 270 determines the concentration of carbonated water set before the production of the carbonated water and controls the number of injections of carbon dioxide according to the determined concentration.

Furthermore, whenever the injection of the carbon dioxide is completed, the controller 270 controls the opening of the second valve 255 to decrease the pressure of the inside of the container 2 in order to prevent the pressure of the inside of the container from increasing according to the injection of the carbon dioxide.

When the production of the carbonated water is completed, the controller 270 determines whether the third carbonated water information region 233c is selected, and when it is determined that the third carbonated water information region 233c is selected, the controller 270 controls an operation of the regulation member 252 to additionally inject carbon dioxide into the container 2.

Here, the determination of whether third carbonated water information region 233c is selected may include determining whether a signal corresponding to a command for additional injection of the carbonic acid is input.

When the carbon dioxide is injected, the controller 270 controls the water level detector for detecting a water level of the container to be deactivated.

Accordingly, it may prevent that the water level in the container is detected as the predetermined water level or more by sloshing of water inside the container due to the injection of the carbon dioxide and thus the production of the carbonated water is stopped.

The controller 270 determines whether the third carbonated water information region 233c is reselected within a preset time, and when it is determined that the third carbonated water information region 233c is reselected, the controller 270 determines that the command for adding carbonic acid is canceled and controls the injection of the carbon dioxide to be stopped.

The controller 270 determines whether the container 2 is separated from the coupler 240 based on a signal detected from the coupling detector 247, and when it is determined that the container 2 is separated from the coupler 240, the controller 270 controls the first input and output part 233 to be deactivated.

At this moment, the controller 270 controls a lamp provided on the first input and output part 233 to be turned off.

As described above, since carbonated water is produced with the concentration of carbonated water set by a user, or carbonated water is produced with an additionally increased concentration of carbonated water by the user, carbonated water having a concentration desired by the user may be provided. Further, since carbonated water is immediately produced and provided to the user at a desired time, the quality of the carbonated water may be maintained whenever the carbonated water is produced.

The controller 270 determines whether the first discharge information region 234a of the second input and output part 234 is selected while the container 2 is not coupled to the coupler 240, and when it is determined that the first discharge information region 234a is selected, the controller 270 controls a lamp of the first discharge information region 234a to be turned on.

Here, the determination of whether the first discharge information region is selected may include determining whether a signal corresponding to a purified water discharge command is input.

The controller 270 determines whether the lever operation detector 221 receives an operation signal while the first discharge information region 234a is selected, and when it is determined that the operation signal of the lever is received, the controller 270 controls the opening of the fourth valve 263 and the fifth valve 265.

When the operation signal of the lever operation detector 221 is not received while discharging the purified water, the controller 270 controls the closing of the fourth valve 263 and the fifth valve 265 to stop the discharge of the purified water.

Furthermore, the controller 270 may control the opening of the fourth valve 263 and the fifth valve 265 at an operation time of the lever to discharge the purified water for a preset time.

When the discharge of the purified water is completed, the controller 270 controls the lamp of the first discharge information region 234a to be turned off.

The controller 270 determines whether the second discharge information region 234b of the second input and output part 234 is selected while the container 2 is not coupled to the coupler 240, and when it is determined that the second discharge information region 234b is selected, the controller 270 controls a lamp of the second discharge information region 234b to be turned on.

Here, the determination of whether the second discharge information region 234b is selected may include determining whether a signal corresponding to a command for ice discharge is input.

The controller 270 determines whether the lever operation detector 221 receives an operation signal while the second discharge information region 234b is selected, and when it is determined that the operation signal of the lever is received, the controller 270 controls the opening of the regulation member 217 disposed at an ice supply pipe so that ice is discharged to a second outlet via the ice supply pipe, and when the operation signal of the lever is not received, the controller 270 controls the closing of the regulation member 217.

When the ice discharge is completed, the controller 270 controls the lamp of the second discharge information region 234b to be turned off.

When it is determined that ejection of the ice making unit 267 is completed, the controller 270 controls the opening of the sixth valve 266 to supply purified water stored in the tank 262 into an ice making part of the ice making unit 267.

The storage part 271 may store a value of the predetermined water level to determine a water overflow of the container.

The storage part 271 stores information on injection of carbon dioxide corresponding to the concentration of carbon dioxide and information on injection of carbon dioxide corresponding to an addition command. Here, the information on injection refers to injection conditions for injecting carbon dioxide and may include the number of injections.

That is, the storage part 271 stores the number of injections of carbon dioxide corresponding to the concentration of carbonated water and stores the number of injections of carbon dioxide corresponding to the command for adding carbon dioxide.

Furthermore, the storage part 271 may store an injection time as an injection condition of the carbon dioxide.

Here, the controller 270 may be a processor, a central processing unit (CPU), a micro controller unit (MCU), etc., and the storage part 271 may be a memory such as a recordable and readable random access memory (RAM), a readable read only memory (ROM), etc.

Figure 12:
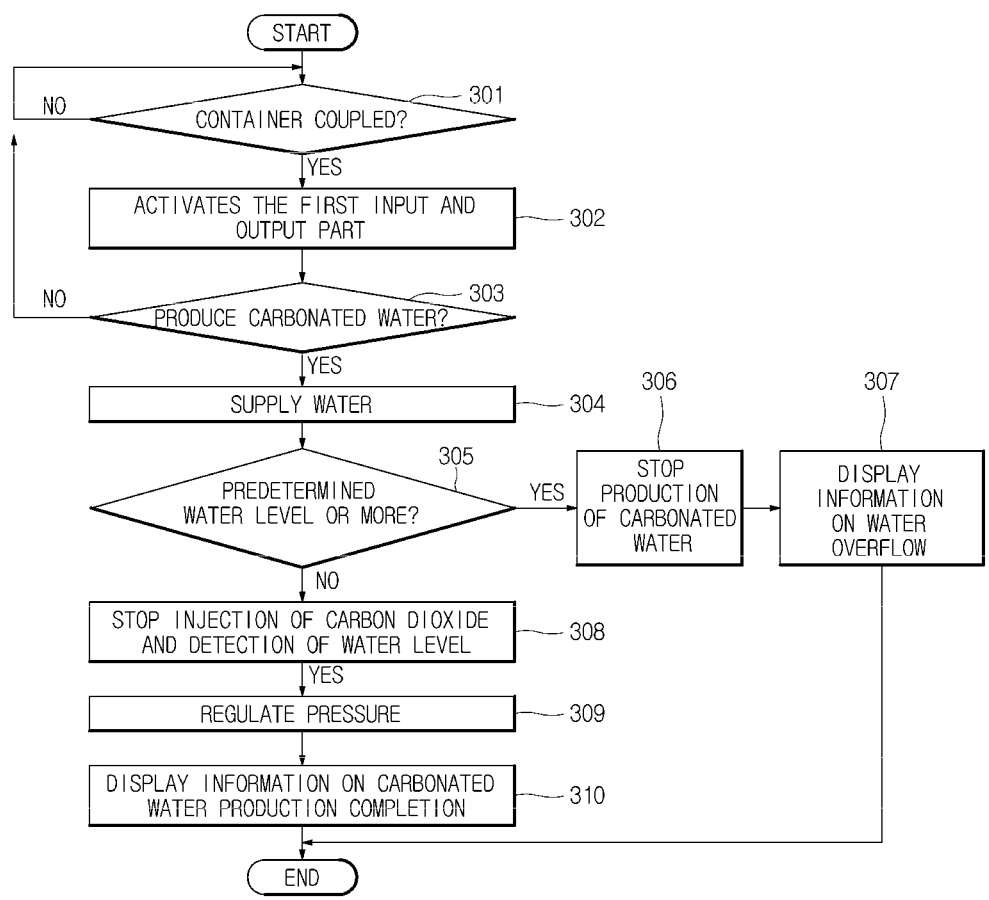
FIG. 12 is a flowchart for controlling the carbonated water production unit according to an embodiment.
Figure 13:
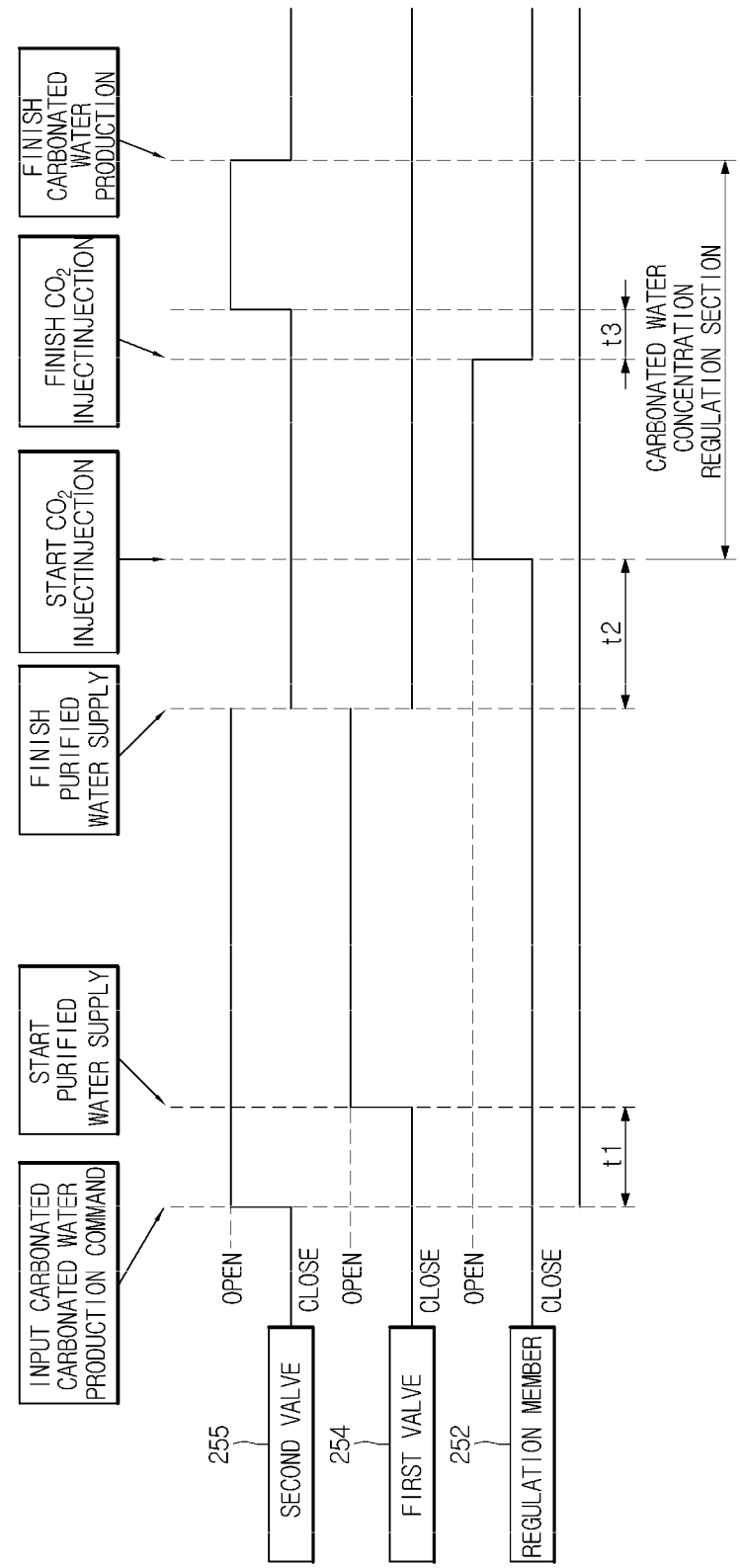
FIG. 13 is a view illustrating a timing sequence for operating the carbonated water production unit according to an embodiment.

FIG. 12 is a flowchart for controlling the carbonated water production unit according to an embodiment and shows a control sequence of the carbonated water production unit 200a inside the dispenser. This will be described with reference to FIGS. 13 and 14.

The carbonated water production unit 200a determines a signal detected from the coupling detector 247 to determine whether the container 2 is coupled to the coupler 240 (301), and when it is determined that the container 2 is coupled to the coupler 240, the carbonated water production unit 200a activates the first input and output part 233 of the user interface (302).

At this moment, the first input and output part 233 operates the lamp 230c provided in the first carbonated water information region 233a, the second carbonated water information region 233b, and the third carbonated water information region 233c to be turned on and generates a signal corresponding to a region selected by a user.

The carbonated water production unit 200a determines whether a signal corresponding to a command for carbonated water production is input while the first input and output part 233 is activated (303), and when it is determined that the signal corresponding to the command for carbonated water production is input, the carbonated water production unit 200a opens the second valve 255 which is a valve for pressure regulation.

Then, after the second valve 255 is opened and a predetermined time t1 elapses, the carbonated water production unit 200a opens the first valve 254 and the fourth valve 263, i.e., valves for purified water supply, so that purified water stored in the tank 262 is supplied to the container 2 (304).

Furthermore, when the carbonated water production unit 200a opens the second valve, the first valve 254 and the fourth valve 263 may be opened simultaneously.

Further, while the carbonated water production unit 200a performs the supply of the purified water, the carbonated water production unit 200a determines an amount of the purified water supplied to the container 2 based on a signal detected from the flow rate detector 264.

Further, when the determined amount of the purified water is a preset amount, the carbonated water production unit 200a completes the supply of the purified water.

Furthermore, the carbonated water production unit may open the first valve 254 and the fourth valve 263 to supply the purified water for a preset time.

Further, when the supply of the purified water is completed, the carbonated water production unit 200a closes the first valve 254 and the fourth valve 263 and also closes the second valve 255, i.e., a valve for pressure regulation, so that the supply of the purified water is blocked.

Then, when the supply of the purified water is completed, the carbonated water production unit 200a determines whether a water level of purified water inside the container 2 is a predetermined water level or more based on a signal detected from the water level detector 246 (305), and when the water level of the purified water inside the container 2 is determined to be the predetermined water level or more, the carbonated water production unit 200a stops the production of the carbonated water (306).

Figure 14:
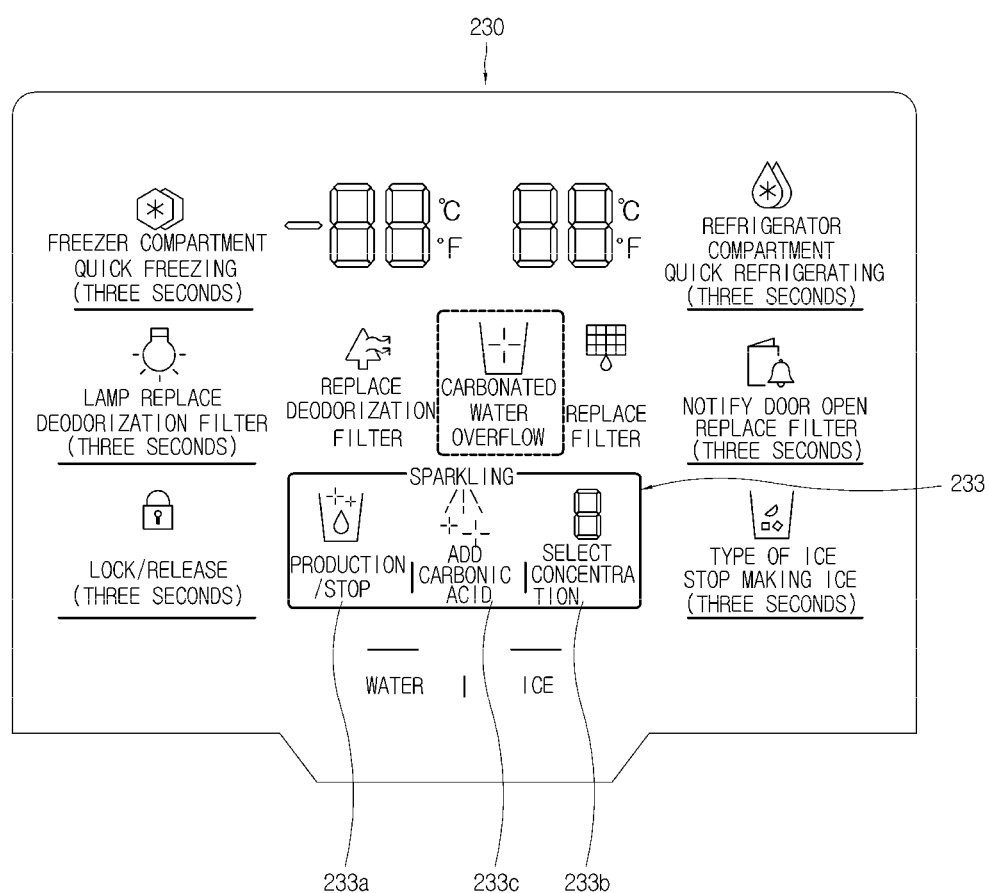
FIG. 14 is a view illustrating a water overflow warning display of a user interface of a dispenser having the carbonated water production unit according to an embodiment.

As shown in FIG. 14, the carbonated water production unit 200a deactivates the first input and output part 233 of the user interface and operates a lamp disposed at the water overflow warning display part 236a of the warning output part 236 to turn on a water overflow icon, and thus water overflow information is displayed (307).

Accordingly, a user may recognize a carbonated water production stop state due to the water overflow of the container 2.

At this moment, the third valve 256a, i.e., a relief valve, of the carbonated water production unit automatically opens, and thus at least one of water, carbon dioxide, and pre-produced carbonated water inside the container 2 discharges to the outside via the discharge pipe 257 and discharge channel 256b.

Furthermore, when the water level of the purified water inside the container is less than the predetermined water level due to the discharge of water inside container to the outside, the carbonated water production unit 200a may perform the production of the carbonated water again.

When the water level of the purified water inside the container 2 is determined to be less than the predetermined water level when the supply of the purified water is completed, the carbonated water production unit 200a operates the regulation member 252 to inject carbon dioxide into the cylinder 251, and at this moment, a detection operation of the water level detector 246 is stopped (308).

Furthermore, while carbon dioxide is supplied from the cylinder 251 to be injected into the container, even when the water level detector 246 is operated, the signal detected from the water level detector may be ignored.

When water supply is completed, the carbonated water production unit may inject carbon dioxide after a predetermined time t2 elapses.

The carbonated water production unit 200a may inject a preset amount of carbon dioxide at a preset pressure into the container 2 based on a signal detected from the pressure detector 253.

While injecting carbon dioxide, the nozzle module 243 is moved to be submerged in purified water inside the container 2 due to an increase in pressure caused by the supply of the carbon dioxide.

Further, when the nozzle module 243 is submerged in the purified water, carbon dioxide is injected into the purified water.

Further, when the injection of the carbon dioxide is completed, the nozzle module 243 is moved to an upper portion of the container again due to a decrease in pressure caused by blocking the supply of the carbon dioxide (see FIGS. 7A to 7D).

As described above, when the nozzle module 243 is positioned at a supply enabled position, an injection nozzle of the nozzle module 243 is positioned at the inside of the purified water inside the container 2.

At this moment, carbon dioxide may be injected into water inside the container at a preset pressure for a preset time.

When the injection of the carbon dioxide is completed, the carbonated water production unit 200a opens the second valve 255, i.e., a valve for pressure regulation, to decrease the pressure of the inside of the container 2, and thus the pressure of the inside of the container is regulated (309).

Furthermore, when the injection of the carbon dioxide is completed and a predetermined time t3 elapses, the carbonated water production unit may also open the second valve.

Then, when the production of the carbonated water is completed, the carbonated water production unit 200a may also control information on the completion of carbonated water production to be displayed (310).

That is, the carbonated water production unit 200a operates the lamp of the first carbonated water information region 233a to be turned on while producing the carbonated water, and when the production of the carbonated water is completed, the carbonated water production unit 200a operates the lamp of the first carbonated water information region 233a to be turned off, and thus a carbonated water production state and a completion state are distinguished.

Furthermore, the carbonated water production unit 200a determines whether the first carbonated water information region 233a is reselected while producing carbonated water, and when it is determined that the first carbonated water information region 233a is reselected, the carbonated water production unit 200a may also stop the production of the carbonated water.

Here, the determination of whether the first carbonated water information region 233a is reselected may include determining whether a signal corresponding to a stop command for carbonated water production is input.

Such a carbonated water production unit sets a concentration of carbonated water to the concentration selected by a user and may produce the carbonated water according to the set concentration.

Such a production sequence will be described with reference to FIG. 15.

Figure 15:
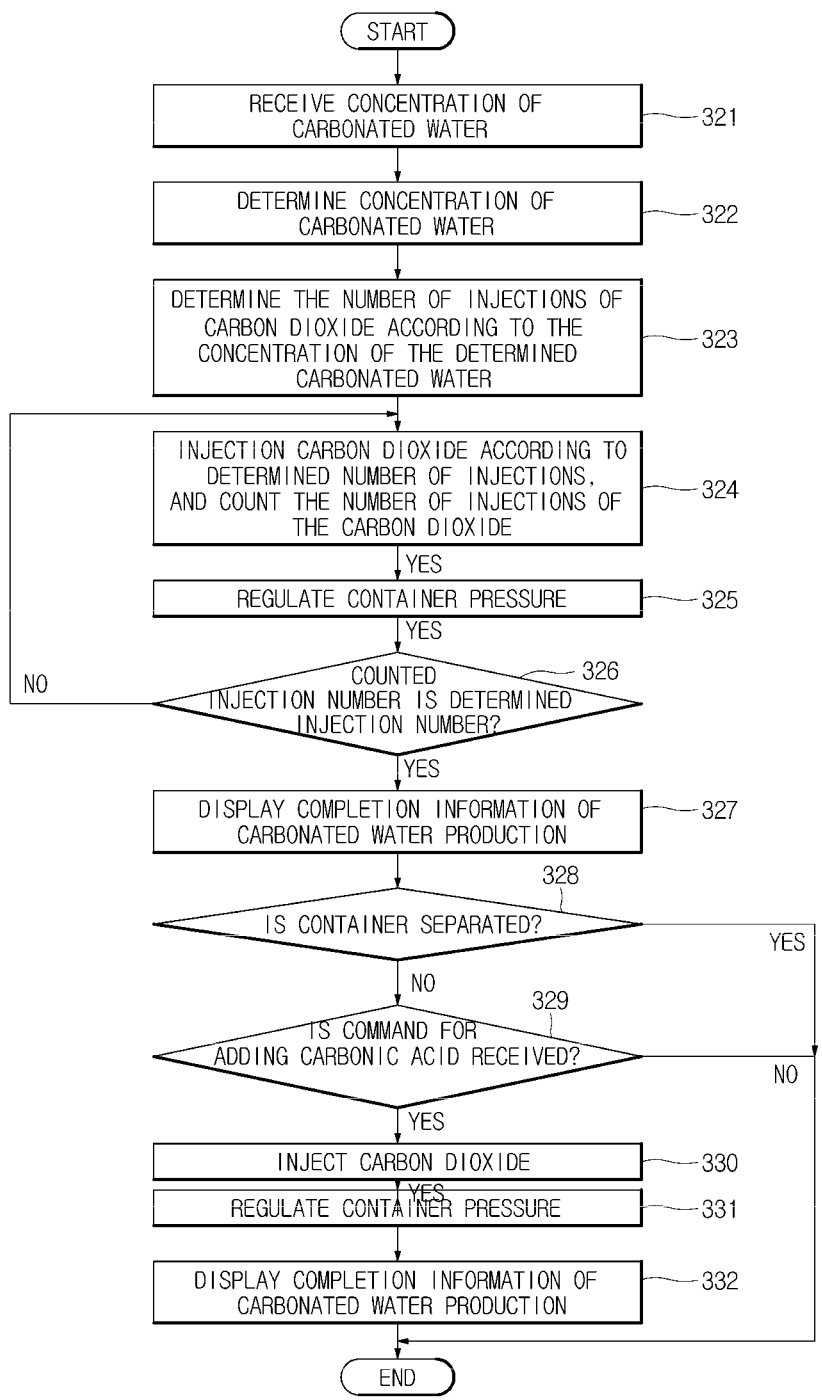
FIG. 15 is a flowchart for controlling concentration of carbonated water in the carbonated water production unit according to an embodiment.

FIG. 15 is a flowchart for controlling concentration of carbonated water in the carbonated water production unit, which will be described with reference to FIGS. 16A, 16B, and 16C.

First, a user may select a concentration of carbonated water by touching the second carbonated water information region 233b of the user interface 230.

Figure 16A:
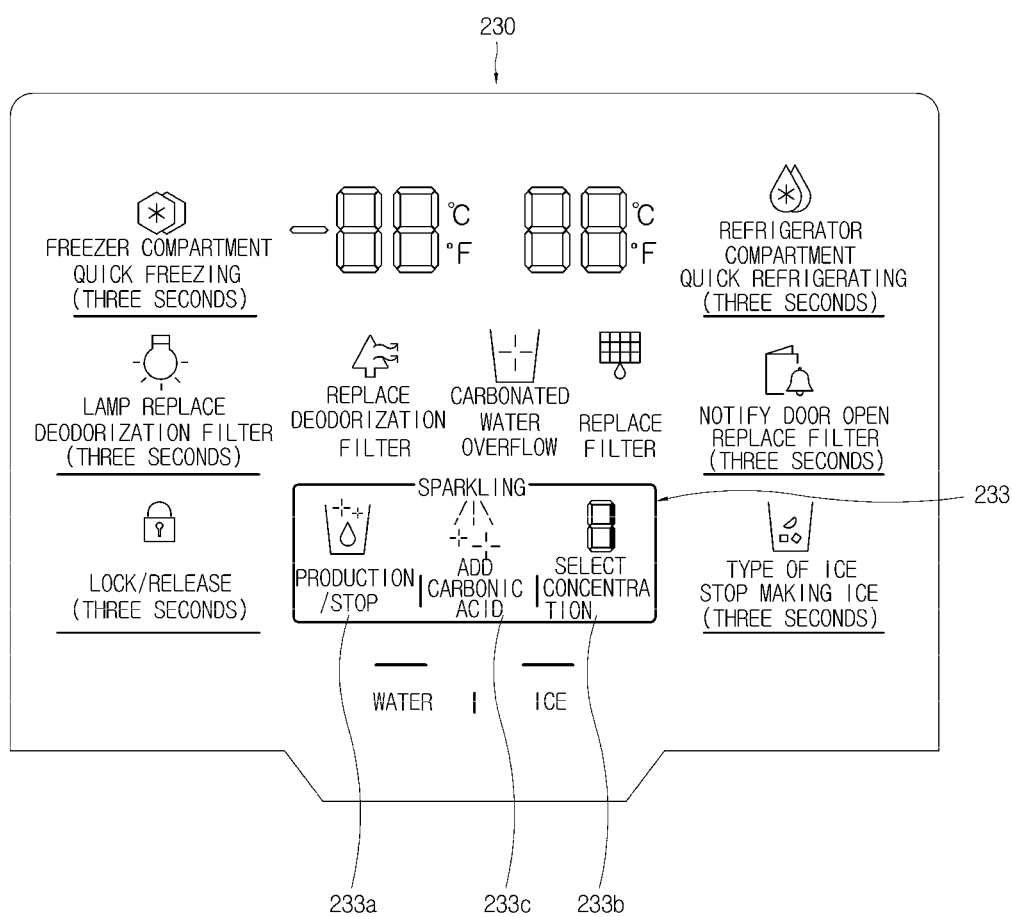
FIGS. 16A, 16B, and 16C illustrate examples for setting concentration of a carbonated water in the user interface of the dispenser having the carbonated water production unit according to an embodiment.

As shown in FIG. 16A, the user interface 230 displays one in the second carbonated water information region 233b as an initial set concentration of carbonated water.

Figure 16B:
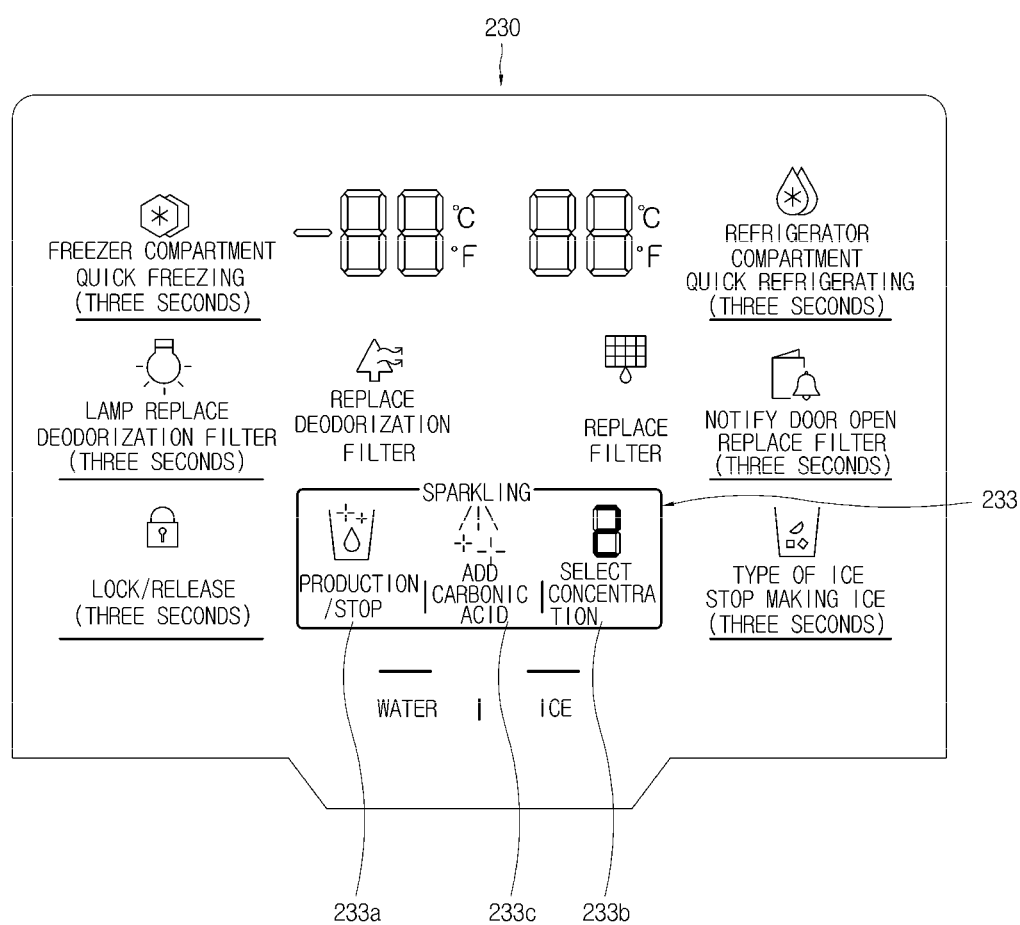

As shown in FIG. 16B, when the second carbonated water information region 233b is touched once by a user while displaying one as the concentration of the carbonated water, the user interface 230 changes the concentration of the carbonated water to two and displays the two. At this moment, the carbonated water production unit sets the concentration of the carbonated water to two.

Figure 16C:
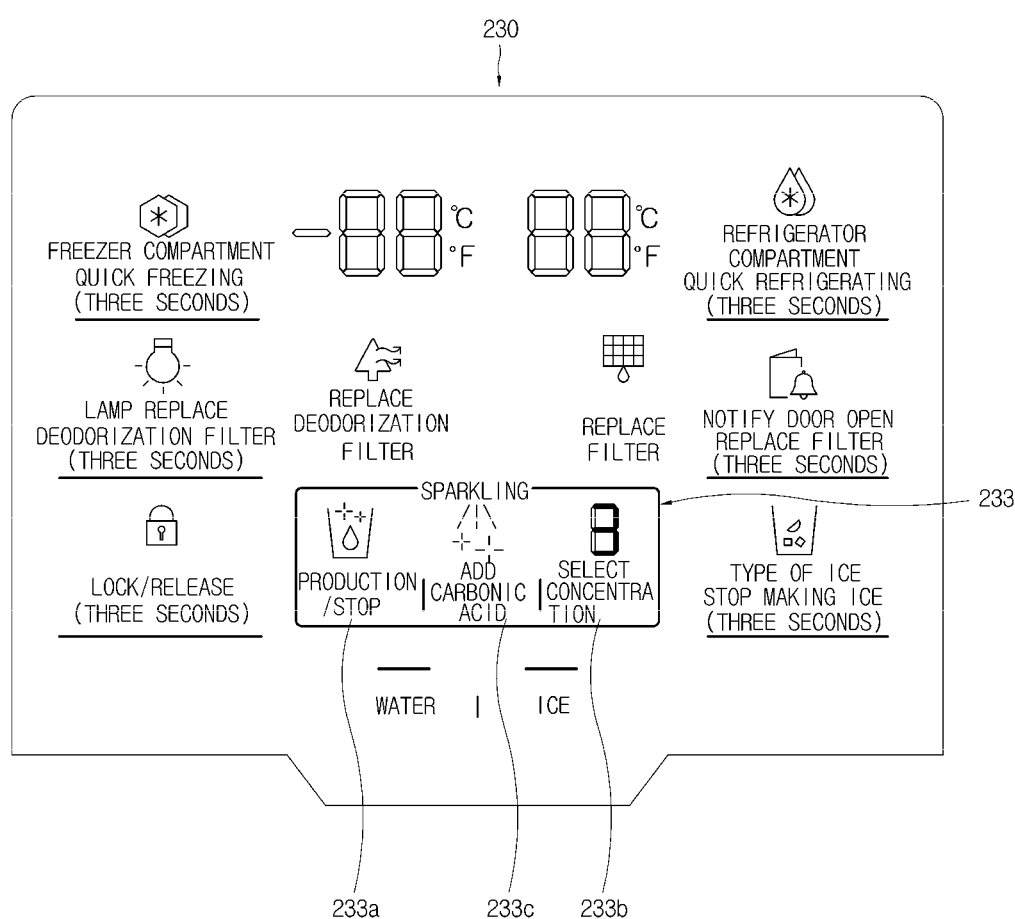

As shown in FIG. 16C, when the second carbonated water information region 233b is touched once by the user while displaying two as the concentration of the carbonated water, the user interface 230 changes the concentration of the carbonated water to three and displays the three. At this moment, the carbonated water production unit sets the concentration of the carbonated water to three.

The carbonated water production unit 200a receives the concentration of the carbonated water input using the user interface 230 (321) and stores the concentration of the received carbonated water as a set concentration.

The carbonated water production unit 200a determines the set concentration of the carbonated water (322) and determines the number of injections of carbon dioxide according to the concentration of the determined carbonated water (323).

When purified water is supplied to the container and a second predetermined time elapses, the carbonated water production unit 200a operates the regulation member 252 to discharge carbon dioxide from the cylinder, injects the discharged carbon dioxide into the container 2 (324), and counts the number of injections of the carbon dioxide (324).

When the injection of the carbon dioxide is completed, the carbonated water production unit 200a opens the second valve 255, i.e., a valve for pressure regulation, to decrease a pressure of the inside of the container 2, and thus the pressure of the inside of the container is regulated (325).

When the preset time elapses, the carbonated water production unit 200a closes the second valve 255 which is a valve for pressure regulation.

The carbonated water production unit may inject carbon dioxide into the container 2 once using the above-described process (324 and 325).

That is, the carbonated water production unit 200a performs a process of injecting carbon dioxide (324) and regulating a pressure of the inside of the container (325) according to the determined number of injections of the carbon dioxide.

For example, it is assumed that the number of injections of the carbon dioxide is one time when the concentration of carbonated water is one, the number of injections of the carbon dioxide is two times when the concentration of the carbonated water is two, and the number of injections of the carbon dioxide is three times when the concentration of the carbonated water is three.

In this case, the carbonated water production unit 200a performs the process of injecting carbon dioxide (324) and regulating the pressure of the inside of the container (325) once when the set concentration of the carbonated water is one, repeatedly performs the process of injecting carbon dioxide (324) and regulating the pressure of the inside of the container (325) twice when the set concentration of the carbonated water is two, and repeatedly performs the process of injecting carbon dioxide (324) and regulating the pressure of the inside of the container (325) three times when the set concentration of the carbonated water is three.

When the counted number of injections of the carbon dioxide is the determined number of injections of the carbon dioxide (326), the carbonated water production unit determines that the production of the carbonated water is completed, and information on the completion of carbonated water production is displayed (327).

When the production of the carbonated water is completed, the carbonated water production unit 200a determines whether the container 2 is separated from the coupler 240 based on a signal detected from the coupling detector 247 (328), and when it is determined that the container 2 is separated from the coupler, the first input and output part 233 are deactivated.

Otherwise, when a state in which the container is coupled to the coupler is maintained, the carbonated water production unit 200a determines whether a command for adding carbonic acid is received (329), and when it is determined that the command for adding carbonic acid is received, the regulation member 252 is operated to supply carbon dioxide from the cylinder 251, and the supplied carbon dioxide is injected into purified water of the container 2 (330).

Here, the determination of whether a command for adding carbon dioxide injection is received may include determining whether the third carbonated water information region 233c is selected.

Furthermore, when the third carbonated water information region 233c is selected, the user interface 230 flickers a lamp disposed at an icon of the third carbonated water information region 233c with predetermined intervals, and thus a user may recognize that the carbon dioxide is added.

Then, when the injection of the carbon dioxide is completed, the carbonated water production unit 200a opens the second valve 255, i.e., a valve for pressure regulation, to decrease a pressure of the inside of the container 2, and thus the pressure of the inside of the container is regulated (331).

Then, when the regulation of the pressure of the inside of the container is completed, the carbonated water production unit 200a closes the second valve 255 which is a valve for pressure regulation.

When the addition of the carbonic acid of the carbonated water is completed, the carbonated water production unit 200a displays information on the completion of carbonated water production (332) and deactivates the first input and output part 233.

Furthermore, an injection amount of the carbon dioxide for one injection when the carbon dioxide is injected in response to the command for the carbonated water production may be the same as or different from an injection amount of the carbon dioxide for additional injection when the carbon dioxide is injected in response to the command for adding carbonic acid.

Here, the different injection amount of the carbon dioxide may refer to a different injection time of the carbon dioxide.

Figure 17:
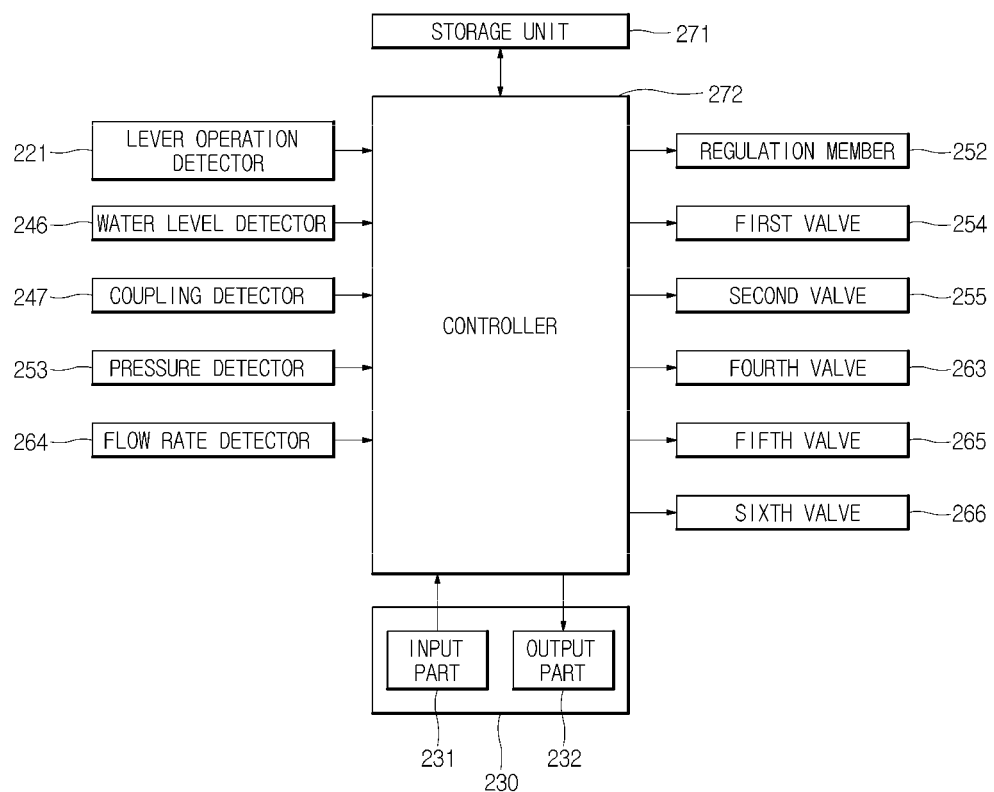
FIG. 17 is a configuration diagram for controlling a dispenser having a carbonated water production unit according to an embodiment.

FIG. 17 is a configuration diagram for controlling a dispenser having a carbonated water production unit according to an embodiment, and since the configurations of the refrigerator and the carbonated water production unit are the same as the configurations previously discussed, descriptions thereof will be omitted.

The refrigerator may include a user interface 230, a plurality of detectors, a controller 272, and a storage part 271 for a configuration of controlling the dispenser.

A first input and output part of the user interface 230 may further include a fourth carbonated water information region (not shown) where an amount of water of carbonated water is input.

For example, the amount of water may be any one of 250 ml and 500 ml.

The storage part 271 stores injection conditions of carbon dioxide corresponding to the amount and concentration of the water of the carbonated water.

That is, the storage part 271 stores an injection time of carbon dioxide corresponding to the amount of the water of the carbonated water and the number of injections of the carbon dioxide according to the concentration of the carbonated water.

For example, an injection time may be s seconds when an amount of water of carbonated water is 250 ml, an injection time may be 2 s seconds when the amount of the water of the carbonated water is 500 ml, the number of injections may be one time when the concentration of the carbonated water is one, the number of injections may be two times when the concentration is two, and the number of injections may be three times when the concentration is three.

Furthermore, the storage part 271 may store the number of injections of carbon dioxide corresponding to a correlation between the amount of water of carbonated water and the concentration of the carbonated water.

For example, the number of injections may be one time when an amount of water of carbonated water is 250 ml and a concentration is one, the number of injections may be two times when the amount of the water of the carbonated water is 500 ml and the concentration is two, the number of injections may be two times when the amount of the water of the carbonated water is 250 ml and the concentration is two, the number of injections may be four times when the amount of the water of the carbonated water is 500 ml and the concentration is two, the number of injections may be three times when the amount of the water of the carbonated water is 250 ml and the concentration is three, and the number of injections may be six times when the amount of the water of the carbonated water is 500 ml and the concentration is three. At this moment, all cases have the same injection time.

Furthermore, the storage part 271 may store an injection time of carbon dioxide corresponding to a correlation between an amount of water of carbonated water and the concentration of the carbonated water.

For example, an injection time may be s seconds when an amount of water of carbonated water is 250 ml and a concentration is one, the injection time may be 2 s seconds when the amount of the water of the carbonated water is 500 ml and the concentration is one, the injection time may be 2 s seconds when the amount of the water of the carbonated water is 250 ml and the concentration is two, the injection time may be 4 s seconds when the amount of the water of the carbonated water is 500 ml and the concentration is two, the injection time may be 3 s seconds when the amount of the water of the carbonated water is 250 ml and the concentration is three, and the injection time may be 6 s seconds when the amount of the water of the carbonated water is 500 ml and the concentration is three. At this moment, all cases have the same number of injections.

The storage part 271 may store an injection time of carbon dioxide corresponding to additional carbon dioxide.

Here, the injection time of the carbon dioxide corresponding to the additional carbon dioxide may vary according to an amount of water.

For example, when the amount of water is 200 ml, an injection time of carbon dioxide may be s seconds, and when the amount of the water is 500 ml, the injection time of the carbon dioxide may be 2 s seconds.

The storage part 271 may also store the number of injections of carbon dioxide corresponding to the additional carbon dioxide.

Here, the number of injections of the carbon dioxide corresponding to the additional carbon dioxide may vary according to an amount of water.

For example, when the amount of water is 200 ml, the number of injections of carbon dioxide is one time, and when the amount of the water is 500 ml, the number of injections of the carbon dioxide may be two times.

Furthermore, an injection condition of carbon dioxide according to one addition of the carbon dioxide may be the same as or different from a one injection condition of carbon dioxide when the concentration is set.

For example, when an amount of water is 200 ml and an injection time of carbon dioxide is 2 s seconds according to a concentration setting, an injection time of carbon dioxide for an addition may be s seconds, and when the amount of the water is 500 ml and the injection time of the carbon dioxide according to the concentration setting is 4 s seconds, the injection time of the carbon dioxide for an addition may be 2 s seconds.

Further, when the amount of the water is 200 ml and the number of injection times of the carbon dioxide is two times during the concentration setting, the number of injections of the carbon dioxide for an addition may be one time, and when the amount of the water is 500 ml and the number of injections of the carbon dioxide according to the concentration setting is four times, the number of injections of the carbon dioxide for an addition may be two times.

The plurality of detectors are the same as those discussed above and a description thereof will be omitted.

The controller 272 controls an operation of a dispenser 200 based on signals detected from the plurality of detectors and a signal of an input part of the user interface.

Here, the control of the operation of the dispenser 200 may include controlling the opening or closing of a first valve 254, a second valve 255, a fourth valve 263, a fifth valve 265, and a sixth valve 266, and controls an operation of a regulation member 252. A description of the same configurations as those discussed above will be omitted.

The controller 272 determines a signal detected from a coupling detector 247 to determine whether a container 2 is coupled to a coupler 240, and when it is determined that the container 2 is coupled to the coupler 240, the controller 272 controls a first input and output part 233 to be activated.

The controller 272 determines concentration of carbonated water and an amount of water of carbonated water selected by a user while the first input and output part 233 is activated and determines injection conditions of carbon dioxide corresponding to the determined concentration and amount of the water of the carbonated water.

When a command for carbonated water production is input, the controller 272 controls the opening of the first valve 254 and the fourth valve 263 to supply purified water stored in a tank 262 to the container 2.

The controller 272 controls the second valve 255 to be opened in order to prevent an increase in pressure of the container 2 due to the supply of the purified water, and when a predetermined time elapses after opening the second valve, the controller 272 controls the supply of purified water.

The controller 272 determines an amount of purified water supplied to the container 2 based on a signal detected from a flow rate detector 264 while supplying the purified water, and when the determined amount of the purified water is the selected amount of water, the controller 272 controls the closing of the first valve 254 and the fourth valve 263 to block the supply of the purified water.

The controller 272 may also control the opening of the first valve 254 and the fourth valve 263 to supply the purified water for a set time according to the selected amount of water while supplying the purified water.

Furthermore, when the supply of the purified water is completed, the controller 272 determines whether a water level of the purified water inside the container 2 is a predetermined water level or more, and when the water level of the purified water inside the container 2 is determined to be the predetermined water level or more, the controller 272 controls the production of the carbonated water to be stopped.

At this moment, the controller 272 controls the first input and output part 233 to be deactivated and controls an operation of a lamp disposed at a water overflow warning display part 236a of a warning output part 236 so that a water overflow icon is turned on.

Accordingly, a user may recognize a water overflow situation in the container 2.

When the supply of the purified water is completed, the controller 272 controls an operation of a regulation member 252, so that carbon dioxide inside the cylinder 251 is discharged.

The controller 272 controls the operation of the regulation member 252 based on an injection condition of carbon dioxide determined while controlling the regulation member, but the control is based on at least one of an injection time and the number of injections of the carbon dioxide.

When the discharge of the carbon dioxide is completed, the controller 272 controls the opening of the second valve 255 to decrease a pressure of the inside of the container 2.

The controller 272 controls the opening of the second valve 255 whenever the carbon dioxide is injected, so that the pressure of the inside of the container is decreased.

When a state in which the container is coupled thereto is maintained when the production of the carbonated water is completed, the controller 272 determines whether a command for adding carbonic acid is input, and when it is determined that the command for adding the carbonic acid is input, the controller 272 controls an additional injection of the carbon dioxide.

Here, the control of the additional injection of the carbon dioxide may include controlling the regulation member to add the carbon dioxide, controlling the movement of a nozzle module before adding the carbon dioxide, and controlling the opening of the second valve after adding the carbon dioxide.

The controller 272 determines whether the container 2 is separated from the coupler 240 based on the signal detected from the coupling detector 247, and when it is determined that the container 2 is separated from the coupler 240, the controller 272 controls the first input and output part 233 to be deactivated.

Furthermore, when the concentration of carbonated water is a predetermined concentration or more by adding carbon dioxide, the controller 272 may control the addition of the carbonic acid to be stopped and may also control an output of additional carbonic acid limitation information.

As described above, since the carbonated water is produced with the concentration of carbonated water set by a user or the carbonated water is generated with the concentration of the carbonated water additionally increased by the user is produced, carbonated water having the concentration desired by the user may be provided. Further, since the carbonated water is produced and provided at a time desired by the user, the quality of carbonated water may be maintained whenever the carbonated water is produced.

Here, the controller 272 may be a processor, a CPU, an MCU, etc., and the storage part 271 may be a memory such as a recordable and readable RAM, a readable ROM, etc.

As is apparent from the above description, when a container is coupled to a carbonic acid production unit according to an embodiment of the disclosure, functions of concentration of carbonated water, a starting or stopping of production of carbonated water, an addition of carbonic acid for the production of carbonated water may be selected, and when the function of the production of carbonated water is selected, a fixed amount of water and carbon dioxide ($CO_2$) gas having a desired concentration may be automatically injected to produce carbonated water having a concentration required by a user.

As described above, since the concentration of carbonated water may be selected, the convenience of a user may be maximized, and since carbon dioxide may be added, the concentration of carbonated water may be additionally regulated according to the desire of the user.

Further, since whether water in a container overflows is detected before injecting carbon dioxide, it may prevent in advance a generation of a water overflow from the container due to stored water in the container even when a fixed amount of water is supplied.

Further, since a process of producing carbonated water is stopped when water overflow is detected, water overflow caused by injecting carbon dioxide may be prevented.

Further, in order to prevent detection of water overflow caused by injecting carbon dioxide when the carbon dioxide is injected when an amount of water in a container is a fixed amount, since the detection of the water overflow is overridden while injecting the carbon dioxide, a stopping of an operation of producing carbonated water may be prevented.

According to an embodiment of the disclosure, consumers' damage caused by water overflow or the like while producing carbonated water may be minimized.

Further, according to an embodiment of the disclosure, since the production of carbonated water not desired by a user may be stopped, production caused by wrong input may be prevented.

Although embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A carbonated water production unit, comprising:
   a coupler configured to be coupled to and decoupled from a container;
   a nozzle module configured to inject carbon dioxide into the container;
   a regulation member disposed upstream of the nozzle module and configured to regulate a supply of the carbon dioxide into the container;
   a first valve configured to regulate a supply of water into the container via a water supply pipe;
   a second valve configured to regulate a pressure of the container and disposed at a pressure regulation pipe configured to allow air in the container to flow therethrough;
   a user interface configured to receive a command for production of carbonated water, an input of a concentration of the carbonated water, and an input to add carbonic acid after the production of the carbonated water is completed, and configured to output information on the production of the carbonated water; and
   a controller configured to control the first valve to supply water when the command for the production of carbonated water is input, determine information on injection of the carbon dioxide corresponding to the concentration of the carbonated water when the supply of water is completed, control the regulation member to inject the carbon dioxide based on the determined information on the injection, control the second valve to regulate the pressure of the container when injection of the carbon dioxide is completed, control the regulation member to additionally infect carbon dioxide when the input to add carbonic acid is received after the production of the carbonated water is completed.

2. The carbonated water production unit of claim 1, wherein:
the controller is configured to control the second valve to regulate the pressure of the container when the additional injection of the carbon dioxide is completed.

3. The carbonated water production unit of claim 1, further comprising a water level detector configured to detect a water level of the container,
wherein the controller is configured to control the production of the carbonated water to be stopped when the detected water level is a predetermined water level or more, and control information on the stopped carbonated water production to be displayed on the user interface.

4. The carbonated water production unit of claim 3, wherein the controller is configured to control the regulation member to deactivate an operation of the water level detector during the injection of carbon dioxide.

5. The carbonated water production unit of claim 1, wherein the controller is configured to determine the number of injections of the carbon dioxide corresponding to the concentration of the carbonated water, and sequentially and repeatedly control the control of the regulation member and a control of opening of the second valve according to the determined the number of injections.

6. The carbonated water production unit of claim 1, wherein:
the user interface is configured to receive an input of a command for stopping carbonic acid production; and
the controller is configured to control the production of the carbonated water to be stopped when a stop command for the production of the carbonated water is input while producing the carbonated water.

7. The carbonated water production unit of claim 1, further comprising a third valve configured to discharge at least one of water, carbonated water, and carbon dioxide inside the container to the outside of the container when the water in the container is a predetermined water level or more.

8. A carbonated water production unit, comprising:
a coupler configured to be coupled to and decoupled from a container;
a coupling detector provided at the coupler and configured to detect coupling of the container;
a nozzle module configured to inject carbon dioxide into the container;
a regulation member disposed upstream of the nozzle module and configured to regulate a supply of the carbon dioxide into the container;
a first valve configured to regulate a supply of water into the container via a water supply pipe;
a second valve configured to regulate a pressure of the container and disposed at a pressure regulation pipe configured to allow air in the container to flow therethrough;
a user interface configured to receive a command for production of carbonated water and an input of a concentration of the carbonated water and configured to output information on the production of the carbonated water; and
a controller configured to control the first valve to supply water when the command for the production of carbonated water is input, determine information on injection of the carbon dioxide corresponding to the concentration of the carbonated water when the supply of water is completed, control the regulation member to inject the carbon dioxide based on the determined information on the injection, control the second valve to regulate the pressure of the container when injection of the carbon dioxide is completed, and control the user interface to be activated when it is determined that the container is coupled to the coupler based on a signal detected from the coupling detector.

9. A refrigerator, comprising:
a dispenser provided at a door, wherein the dispenser includes:
a first outlet configured to discharge water and carbon dioxide for production of carbonated water;
a second outlet configured to discharge water stored in a tank of a refrigerator compartment and ice in a icehouse;
a user interface configured to receive a selection of any one object among carbonated water, water, and ice, receive an input of a command for production of carbonated water and a concentration of the carbonated water, and output information on the production of the carbonated water;
a coupler provided at the first outlet and configured to be coupled to and decoupled from a container; and
a controller configured to control the user interface to be activated when the controller determines based on a detection signal that the container is coupled to the coupler, control water in the tank to be supplied into the container when a command for the production of the carbonated water is input, control carbon dioxide to be supplied into the container based on information on injection of carbon dioxide corresponding to the concentration of the carbonated water when the supply of water is completed, and control a pressure of the container to be regulated when the injection of carbon dioxide is completed.

10. The refrigerator of claim 9, further comprising:
a first valve configured to regulate the supply of water from the tank into the container;
a regulation member disposed upstream of a nozzle module configured to inject carbon dioxide, the regulation member configured to regulate a supply of the carbon dioxide via the nozzle module; and
a second valve disposed at a pressure regulation pipe through which air of the container flows and configured to regulate the pressure of the container,
wherein the controller is configured to control opening of the second valve and the first valve when the command for production of the carbonated water is input, control closing of the first valve and second valve when the supply of the water is completed, and control the opening of the second valve when the injection of the carbon dioxide is completed.

11. The refrigerator of claim 10, wherein:
the user interface is configured to receive an input of a command for adding carbonic acid; and
the controller is configured to control the regulation member for additional injection of carbon dioxide when the production of the carbonated water is completed and the command for adding carbonic acid is input.

12. The refrigerator of claim 10, further comprising a flow rate detector configured to detect an amount of water which flows in a water supply pipe from the tank to the container, wherein the controller is configured to control the opening of the first valve based on the detected amount of the water.

13. The refrigerator of claim 9, further comprising a water level detector configured to detect a water level of the container,
wherein the controller is configured to control the production of the carbonated water to be stopped when the detected water level is a predetermined water level or more, and control information on the stopped carbonated water production to be displayed on the user interface.

14. The refrigerator of claim 9, wherein the controller is configured to determine the number of injections of carbon dioxide corresponding to the concentration of the carbonated water, and sequentially and repeatedly control a control of a regulation member and a control of opening of a second valve according to the determined number of injections.

15. The refrigerator of claim 9, wherein the dispenser further includes:
a third valve configured to discharge water and carbon dioxide inside the container to the outside of the container when the water in the container is a predetermined water level or more; and
a discharge channel configured to guide the discharged water by opening the third valve to the outside.

16. A method of controlling a carbonated water production unit, comprising:
determining whether a container is coupled to a coupler;
controlling opening of a first valve to supply water stored in a tank to the container when it is determined that the container is coupled to the coupler and a command for production of carbonated water is received;
controlling a regulation member provided upstream of a nozzle module to inject carbon dioxide into the container through the nozzle module when the supply of water to the container is completed;
controlling opening of a second valve provided at a pressure regulation pipe to regulate a pressure of the inside of the container when the injection of carbon dioxide is completed; and
outputting information on the completion of the production of the carbonated water,
wherein the controlling of the regulation member includes controlling the injection of carbon dioxide based on a concentration of the carbonated water input through a user interface.

17. The method of claim 16, further comprising controlling the regulation member to additionally inject carbon dioxide when the production of the carbonated water is completed and a command for adding carbonic acid is input.

18. The method of claim 16, wherein the controlling of the opening of the first valve includes:
determining an amount of water which flows in a water supply pipe from the tank to the container; and
determining a completion time of the supply of water based on the determined amount of water.

19. The method of claim 16, further comprising:
determining a water level of the container when the supply of water to the container is completed and controlling the production of the carbonated water to be stopped when the determined water level is a predetermined water level or more; and
controlling information on the stopped carbonated water production to be displayed on the user interface.

20. The method of claim 19, further comprising deactivating an operation of the water level detector while controlling the regulation member.

21. The method of claim 16, wherein the controlling of the injection of carbon dioxide includes:
determining the number of injections of carbon dioxide corresponding to the concentration of the carbonated water;
controlling the number of times the regulation member is controlled to inject carbon dioxide according to the determined number of injections; and
opening the second valve when the injection of carbon dioxide is completed.

22. The method of claim 16, further comprising controlling the production of the carbonated water to be stopped when a stop command for the production of the carbonated water is input while producing the carbonated water.

* * * * *